United States Patent
Lopez et al.

(10) Patent No.: US 9,332,541 B2
(45) Date of Patent: May 3, 2016

(54) METHODS AND DEVICES FOR TRANSMISSION OF SIGNALS IN A TELECOMMUNICATION SYSTEM

(75) Inventors: Miguel Lopez, Solna (SE); Stefan Eriksson Löwenmark, Hässelby (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 603 days.

(21) Appl. No.: 13/635,624

(22) PCT Filed: Sep. 3, 2012

(86) PCT No.: PCT/SE2012/050933
§ 371 (c)(1),
(2), (4) Date: Sep. 17, 2012

(87) PCT Pub. No.: WO2013/158005
PCT Pub. Date: Oct. 24, 2013

(65) Prior Publication Data
US 2013/0272273 A1    Oct. 17, 2013

Related U.S. Application Data

(60) Provisional application No. 61/625,313, filed on Apr. 17, 2012.

(51) Int. Cl.
*H04J 3/00* (2006.01)
*H04W 72/04* (2009.01)
*H04L 1/00* (2006.01)
(Continued)

(52) U.S. Cl.
CPC ........... *H04W 72/0446* (2013.01); *H04J 11/00* (2013.01); *H04L 1/0001* (2013.01); *H04L 27/2602* (2013.01); *H04L 27/2634* (2013.01); *H04L 27/2649* (2013.01); *H04L 27/2003* (2013.01)

(58) Field of Classification Search
None
See application file for complete search history.

(56) References Cited

U.S. PATENT DOCUMENTS

| 6,215,762 | B1 | 4/2001 | Dent et al. | |
|---|---|---|---|---|
| 2002/0093928 | A1* | 7/2002 | LoGalbo | H04L 1/0059 370/336 |

(Continued)

FOREIGN PATENT DOCUMENTS

| AU | 2011202942 B2 | 8/2012 |
|---|---|---|
| WO | 9905797 A2 | 2/1999 |
| WO | 2006118684 A1 | 11/2006 |

OTHER PUBLICATIONS

Telefon AB LM Ericsson, Fast Feedback Channel (v1), 3GPP TSG GERAN#44 WG1, GP-091988, Oct. 20, 2009, Sophia Antipolis, France.

(Continued)

*Primary Examiner* — Kwang B Yao
*Assistant Examiner* — Hardikkumar Patel
(74) *Attorney, Agent, or Firm* — Patents on Demand, P.A.; Brian K. Buchheit; Scott M. Garrett

(57) ABSTRACT

Transmitter and receiver technologies are provided that allow more than two users in a time-slotted communications system to share the same time slot by creating orthogonal sub-channels, while keeping the receiver complexity low are provided. Moreover, the users can in accordance with some embodiments employ GMSK or other non-linear continuous phase modulation technique.

25 Claims, 18 Drawing Sheets

(51) Int. Cl.
*H04J 11/00* (2006.01)
*H04L 27/26* (2006.01)
*H04L 27/20* (2006.01)

(56) References Cited

U.S. PATENT DOCUMENTS

| | | | | |
|---|---|---|---|---|
| 2004/0196861 A1* | 10/2004 | Rinchiuso | ............... | H04B 7/264 370/441 |
| 2005/0030911 A1* | 2/2005 | Tiedemann | ............ | H04B 7/264 370/278 |
| 2005/0052991 A1* | 3/2005 | Kadous | ................. | H03M 13/33 370/216 |
| 2009/0122897 A1* | 5/2009 | Belogolovy | .......... | H04L 1/0612 375/267 |
| 2010/0220683 A1* | 9/2010 | Novak | .................. | H04L 5/0044 370/330 |
| 2010/0296506 A1* | 11/2010 | Ryu | ...................... | H04L 1/0086 370/350 |
| 2010/0304706 A1* | 12/2010 | Haverty | ................... | H04K 3/45 455/404.1 |
| 2011/0065443 A1* | 3/2011 | Yellin | ................... | H03M 13/13 455/452.1 |
| 2011/0119456 A1* | 5/2011 | Ipek | .................... | G06F 11/1008 711/162 |
| 2011/0170575 A1* | 7/2011 | Harrison | .............. | H04B 7/0678 375/146 |
| 2012/0188989 A1* | 7/2012 | Yokota | .................. | H04L 1/0002 370/336 |
| 2013/0039398 A1* | 2/2013 | Ko | ............................ | H04L 1/08 375/219 |

OTHER PUBLICATIONS

Third Generation Partnership Project, "3GPP TS 45.004 V9.1.0 (May 2010)," 3rd Generation Partnership Project; Technical Specification; Group GSM/EDGE; Radio Access Network; Modulation (Release 9). May 2010. pp. 1-18.

Luo, et al. "The Performance Comparison of two Multi-User Reusing-One-Slot Schemes," IEEE; Wireless and Optical Communications Conference (WOCC), 2010 19th Annual. May 14-15, 2010. pp. 1-5.

Zhou, Shengli et al., "Chip-Interleaved Block-Spread Code Division Multiple Access", IEE Transaction on Communications, vol. 50, No. 2, Feb. 2002, 235-248.

* cited by examiner

METHODS AND DEVICES FOR TRANSMISSION OF SIGNALS IN A TELECOMMUNICATION SYSTEM

FIELD OF THE INVENTION

The present invention relates to methods and devices for transmission of signals in a telecommunication system.

BACKGROUND

In order to continue improving the spectral efficiency of GSM/EDGE Global (System for Mobile Communication (GSM) Enhanced Data for GSM Evolution), there is a need to find effective ways of multiplexing multiple users' signals into a single time slot over a 200 kHz channel while avoiding or minimizing mutual interference among users.

In accordance with a proposal in 3GPP/GERAN (third generation partnership project/GSM EDGE Radio Access Network a fast feedback channel for Voice over IP is proposed, see GERAN#44 GP-091988 "Fast Feedback Channel" (v1). The idea is to allow the Voice over internet protocol (IP) users to signal the network when there are packets available for transmission. This channel must allow fast feedback and must consume as little bandwidth as possible. To this end, several users are multiplexed into one timeslot by means of time division multiplexing.

Another example is Voice services over Adaptive Multi-user channels on One Slot (VAMOS), in which up to two full rate users are multiplexed in the same time slot. VAMOS is a standardized 3GPP/GSM feature. However, in the uplink, the receiver requires complex multi-user detection since the two user signals are ordinary Gaussian minimum shift keying (GMSK) co-channel interferers.

Due to the scarcity of the electromagnetic spectrum, it is desirable to multiplex more than 2 users into a single time slot, while keeping the receiver complexity low. Moreover, it is desirable to allow the users to employ GMSK modulation. This non-linear modulation technique has very good spectral properties and it is well suited for energy efficient analog RF front ends. Energy efficiency is always important in mobile stations.

Multi-user multiplexing has been standardized in GSM. In the uplink the users transmit using GMSK modulation, and become ordinary co-channel interferers. In the downlink AQPSK modulation is used, see 3GPP TS 45.004 v9.1.0. Note that neither the uplink nor the downlink transmission modes in VAMOS create truly orthogonal sub-channels.

The basic principle of VAMOS can not be easily extended to more than two users. For example in the uplink, a variant of VAMOS for 4 users would create 4 co-channel interferers. A legacy Base Transceiver Station (BTS) receiver with one or two antennas would have very poor performance. Furthermore, since some form of joint or sequential detection is required, the receiver algorithms would be quite complex.

Hence there exists a need for an improved transmission method.

SUMMARY

It is an object of the present invention to provide improved methods and devices to address at least some of the problems as outlined above.

This object and others are obtained by the methods and devices as described herein.

In PCT/SE2010/051082 a multi-user multiplexing technique based on block repetition is described. Unlike VAMOS, it creates orthogonal sub-channels, and the demodulator complexity is independent of the number of users. This methodology is based on two principles. The first is block repetition, and the second is user specific symbol rotation. A basic assumption is that a linear modulator is used.

The block repetition technique in PCT/SE2010/051082 relies on the fact that a linear modulator is used. In particular, user specific symbol rotation is introduced in order to generate truly orthogonal sub-channels. This idea can not be applied to GMSK or other non-linear continuous phase modulation techniques.

In accordance with some embodiments described herein transmitter and receiver technologies that allow more than two users to share the same time slot by creating orthogonal sub-channels, while keeping the receiver complexity low are provided. Moreover, the users can in accordance with some embodiments employ GMSK or other non-linear continuous phase modulation technique.

Thus, methods for multi-user transmission and reception are described. The transmitted signals employ some non-linear continuous phase modulation (CPM) such as GMSK. Several users can be multiplexed into the same time slot. The transmission and reception methods create truly orthogonal sub-channels. Thus, the data for each user can be perfectly separated with a single antenna receiver.

In accordance with some embodiments a method of transmitting signal with orthogonality that is appropriate for GMSK signals or other non-linear CPM signals is described. The method is based on block repetition, followed by a block-wise application of a technique based on the Hadamard transform. The Hadamard transform is usually applied to real or complex numbers, but can here serve as a tool for transforming blocks of bits. This procedure creates signals that are orthogonal.

Further, In accordance with some embodiments, on the receiver side, the received signal is split into blocks. The blocks are stacked into a block column vector, and a Hadamard transform is applied block-wise to the vector. This procedure decouples the users, and each user can be demodulated independently of the others, using an ordinary GMSK demodulator.

In accordance with one exemplary embodiment a method of modulating a signal to be transmitted from a transmitter is provided where the transmitted signal is transmitted in a slot with multiple users. The method comprises obtaining user specific payload bits in a block and the rate by which the transmitter is to transmit in the slot. The transmitter then repeats the block to form a combined block, where the block is repeated a number of times equal to the inverse of the rate with which the transmitter transmits in the slot and where the bits in each repeated block are then left intact or are flipped. The combined block of payload bits is then burst formatted and modulated.

In accordance with one embodiment the blocks that are flipped are selected according to a row of a Hadamard matrix.

In accordance with one embodiment the number of columns of the Hadamard matrix is at least the inverse of the rate with which the transmitter transmits in the slot.

In accordance with one embodiment the selected row is user specific among the multiple users of the slot.

In accordance with one embodiment the combined block is divided into two equal block halves. In accordance with one embodiment a cyclic prefix is added to each of the two block halves of equal length.

In accordance with one embodiment the burst is formatted in accordance with a GSM burst format.

In accordance with one embodiment the burst is modulated using a GMSK modulator.

In accordance with one embodiment 9 the modulated signal is transmitted from a mobile station.

In accordance with one embodiment the bandwidth in the slot is divided unequally between the users in the slot.

In accordance with one embodiment the bandwidth in the slot is divided equally between the users in the slot. In accordance with one embodiment the rate is then determined by the number of users in the slot. In accordance with one embodiment the block is repeated as many times as there are users in the slot. In accordance with one embodiment the number of columns of the Hadamard matrix is equal to the number of users in the slot.

Further, in accordance with one some embodiments a method of receiving a modulated signal from a user transmitting a signal in a slot with multiple users is provided. The method comprises obtaining the rate of the user in the slot, and the row of a Hadamard matrix used by the user. Further, the synchronization position is determined and the received signal is partitioned into blocks of equal length, where the number of blocks corresponds to the inverse of the rate of the user. The samples in each partitioned block are unflipped such that all blocks flipped at the transmitter are multiplied by $-1$, and a result block is formed by adding elementwise the entries in all the partitioned blocks. The result block is then demodulated.

The invention also extends to receivers and transmitters arranged to perform the methods as described herein. The receivers and transmitters can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Additional objects and advantages of the invention other than the ones set out above will become apparent from the following detailed description of the invention.

BRIEF DESCRIPTION OF THE DRAWINGS

For a better understanding, reference is made to the following drawings and preferred embodiments of the invention.

DETAILED DESCRIPTION

Figure 1:
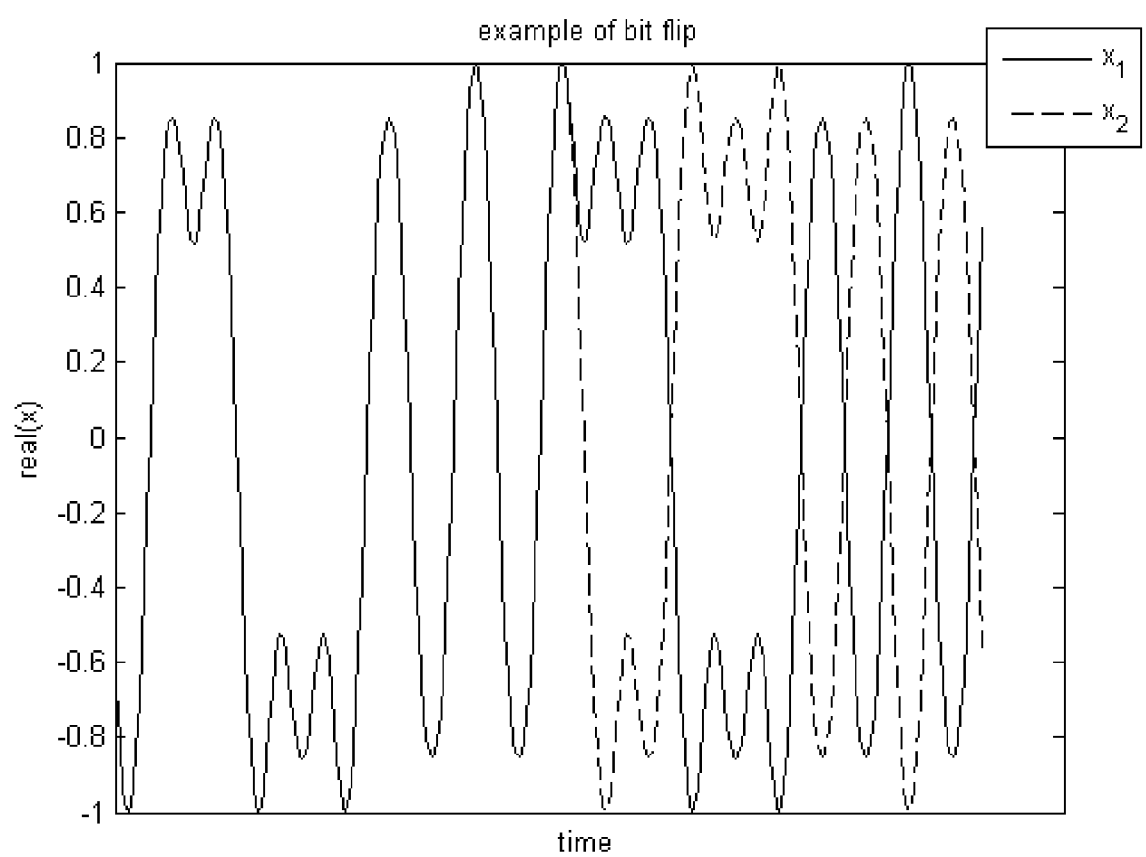
FIG. 1 illustrate a phase shift.

For the purposes of the below exemplary description the following terminology will be used.

A burst is a period of Radio Frequency (RF) carrier which is modulated by a data stream. A burst therefore represents the physical content of a timeslot.

Tail bits are modulating bits with predefined states, known to both the receiver and the transmitter. They are appended at the beginning and end of a burst. Tail bits need not be user specific.

Training sequence bits are modulating bits with predefined states, known to both the receiver and the transmitter. They are typically inserted as a midamble in a burst. Training sequence bits are user specific.

Payload bits are bits obtained from the information data stream that each user needs to transmit, after channel coding (channel coding includes interleaving and possibly puncturing) and (optionally) encryption. The payload bits may also include bits used for in-band signaling, such as stealing flags. The payload bits are user specific and are unknown at the receiver side.

Cyclic prefix bits are payload bits that are copied from the end of a block of payload bits and appended at the beginning of said block. A burst can contain more than one cyclic prefix, since it is sometimes advantageous to divide the payload data into several sub-blocks and append a cyclic prefix to each sub-block.

GMSK Modulation

GMSK is a form of continuous phase modulation (CPM). It is defined in 3GPP TS 45.004 as follows. Let $\vec{d} = \{d_i\}_{i=1}^{N}$ be a sequence of bits. Each bit $d_i$ is differentially encoded. The output of the differential encoder is:

$$\hat{d}_1 = d_1$$

$$\hat{d}_i = d_i \oplus d_{i-1}$$

where $\oplus$ denotes modulo 2 addition.

The modulating data value $\alpha_i$ input to the modulator is:

$$\alpha_i = 1 - 2\hat{d}_i (\alpha_i \in \{-1, +1\})$$

The modulating data values $\alpha_i$ as represented by Dirac pulses excite a linear filter with impulse response defined by:

$$g(t) = h(t) * rect\left(\frac{t}{T}\right)$$

where the function rect(x) is defined by:

$$rect\left(\frac{t}{T}\right) = \frac{1}{T} \text{ for } |t| < \frac{T}{2}$$

$$rect\left(\frac{t}{T}\right) = 0 \text{ otherwise}$$

and * means convolution. T is the bit period (=48/13 us in GSM), and h(t) is defined by:

$$h(t) = \frac{\exp\left(\frac{-t^2}{2\delta^2 T^2}\right)}{\sqrt{(2\pi)} \cdot \delta T}$$

where $\delta = \frac{\sqrt{\ln(2)}}{2\pi BT}$ and $BT = 0.3$.

The phase of the modulated signal is:

$$\varphi(t'; \vec{d}) = \Sigma_i \alpha_i \pi h \int_{-\infty}^{t'-iT} g(u) du$$

where the modulating index h is ½ (maximum phase change in radians is π/2 per data interval).

The time reference t'=0 is the start of the active part of the burst. This is also the start of the bit period of bit number 0 (the first tail bit) as defined in 3GPP TS 45.002.

The baseband signal, except for start and stop of the TDMA burst may be expressed as:

$$x(t'; \vec{d}) = \exp(j(\varphi(t'; \vec{d}) + \phi_0))$$

where $\phi_0$ is a random phase and is constant during one burst.

The Hadamard Transform

The Hadamard transform is an orthogonal transformation. It is usually defined in matrix form. For any integer, n≥0, $H_n$ is a matrix of dimension $2^n \times 2^n$ defined by the recursion $$H_0 = [1],$$

$$H_n = \begin{bmatrix} H_{n-1} & H_{n-1} \\ H_{n-1} & -H_{n-1} \end{bmatrix}, n > 0.$$

For example $$H_1 = \begin{bmatrix} 1 & 1 \\ 1 & -1 \end{bmatrix}$$

$$H_2 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

$$H_3 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

Note that $H_n \cdot H_n = 2^n \cdot I$, where I denotes the identity matrix. The entry in the k-th row and m-th column of the Hadamard matrix shall be denoted $H_n(k,m)$, $1 \leq k, m \leq 2^n$.

Generalization of the Hadamard Transform and Hadamard Product

A special multiplication operation denoted • is defined first. Assume an integer $i \in \{-1, +1\}$ and a (row or column) vector of bits $\vec{b} = [b_1, \ldots, b_N]$, where $b_k \in \{0,1\}$. The integer i represents a sign. Then define:

$$i \cdot \vec{b} = \vec{b} \cdot i \equiv \left[ \frac{1-i}{2} \oplus b_1, \frac{1-i}{2} \oplus b_2, \ldots, \frac{1-i}{2} \oplus b_N \right].$$

In other words, if i is positive then $i \cdot \vec{b} = \vec{b}$, and if i is negative then $i \cdot \vec{b}$ is obtained flipping the bits of $\vec{b}$. Therefore, the operation $-1 \cdot \vec{b}$ shall be referred to as bit flipping. In other words in bit flipping 1's are mapped to 0's and vice versa. For example when flipping bits in a block all binary 1's in the block will become binary 0's and all binary 0's will become binary 1's. This (seemingly strange) operation is motivated by the following example. Let's suppose we are given a vector or block of bits $\vec{b} = [b_1, \ldots, b_N]$. One can form larger blocks by repetition combined with the bit flip operation. For example $$\vec{r}_1 = [+1 \cdot \vec{b}, +1 \cdot \vec{b}],$$

$$\vec{r}_2 = [+1 \cdot \vec{b}, -1 \cdot \vec{b}].$$

Note that the coefficients of the Hadamard transform $H_1$ have been chosen for the bit flips. Then form the continuous time GMSK modulated signals $$x_1(t'; \vec{r}_1) = \exp(j(\varphi(t'; \vec{r}_1) + \phi_0)),$$

$$x_2(t'; \vec{r}_2) = \exp(j(\varphi(t'; \vec{r}_2) + \phi_0)).$$

Roughly speaking, these two signals are identical during the first half of their total duration. At this point the bit flip induces a relative phase shift of π radians between the two signals, as illustrated in FIG. 1. In FIG. 1, the effect of bit flip on baseband signals is shown. Only the real part shown. Ignoring border effects, the superposition of the two halves of the first signal give an amplification of the first signal, while the superposition of the two halves of the second signal cancels completely the second signal. Similarly, the difference of the two halves of the first signal cancels out the first signal, while the difference of the two halves of the second signal amplifies the second signal. At this point, it should be noted that the definition of bit flipping is tailored to the GMSK modulator with differential encoding. Had a GMSK modulation without differential encoding been used then a different definition had been stated.

This notion of multiplication will allow application of a generalized version of the Hadamard transform at the transmitter, as is shown below.

Given two matrices A,B of the same dimensions, their Hadamard product is defined by element-wise multiplication. In Matlab notation this is written A·*B. A generalization of the ordinary Hadamard product is needed. Assume A is a block matrix where each block is a vector of bits and $H_n$ is a Hadamard matrix. Define the generalized Hadamard matrix product $C = A \cdot H_n$ by element-wise multiplication using the multiplication operator • instead of the ordinary multiplication:

$$C(k,m) = A(k,m) \cdot H_n(k,m).$$

Transmitter

The following notation will be used. The symbol ⊗ denotes the Kronecker product, $1_{M \times N}$ is a matrix of ones of size M×N, and using the Matlab shorthand A(k,:) or A(k,m:n) to denote a row or a slice of a row of the matrix A.

Here two exemplary embodiments of a transmitter are given. It is to be noted that the transmitters described below are only exemplary. Hence some of the steps performed by the transmitters may be optional in other transmitter embodiments without explicitly being designated as optional. The same applies to the receivers described herein.

Transmitter, First Version

The number of users $N_u$ is of the form $N_u=2^m$ for some integer m>0. Let $\vec{b}_k$ be the vector of N payload bits for user $1 \leq k \leq 2^m$, $\vec{t}_{left}^k$, $\vec{t}_{right}^k$ be the vectors of left and right tail bits, and $\vec{s}_k$ be the vector of training sequence bits.

Define $$\vec{u}_k = (1_{1 \times 2^m} \otimes \vec{b}_k) \cdot H_m(k,:),$$

$$\vec{u}_k^{left} = \vec{u}_k(1:2^{m-1}),$$

$$\vec{u}_k^{right} = \vec{u}_k(2^{m-1}+1:2^m),$$

$$\vec{r}_k = [\vec{t}_{left}^k, \vec{u}_k^{left}, \vec{s}_k, \vec{u}_k^{right}, \vec{t}_{right}^k].$$

That is, the formatted burst for user k consists of tail bits, training sequence bits and $2^m$ repetitions of the block of payload bits $\vec{b}_k$, each block being modified by bit flip according to the sign of the entries in the k-th row of the Hadamard matrix.

The continuous time baseband signal for user k is given by $$x_k(t'; \vec{r}_k) = \exp(j(\phi(t'; \vec{r}_k) + \phi_0^k)).$$

Here $\phi_0^k$ is a random phase that is constant during the duration of one burst.

Recall that, as defined above, the first step in the GMSK modulator is to perform differential encoding of the transmitted bits $\vec{r}_k$. Without differential encoding, the multiplication operation • would have to be re-defined in order to obtain the desired orthogonality properties among the transmitted signals.

Finally, note that the payload bits for each user can be stacked into a matrix which can be expressed succinctly in terms of block repetition (given by the Kronecker product below) times (using the generalized Hadamard product) the Hadamard transform matrix.

$$U = \begin{bmatrix} \vec{u}_1 \\ \vdots \\ \vec{u}_{2^m} \end{bmatrix} = \left( 1_{1 \times 2^m} \otimes \begin{bmatrix} \vec{b}_1 \\ \vdots \\ \vec{b}_{2^m} \end{bmatrix} \right) \cdot H_m.$$

In general, the users can have different transmitters and be located in physically separated places. So the transmitter algorithm can be thought of as a distributed application of the generalized Hadamard transform using the generalized Hadamard product.

Transmitter, Second Version

A simplification of the receiver processing can be achieved by adding a cyclic prefix at beginning of each half burst. Let $L \geq 0$ be the length of the cyclic prefix. It is a design parameter. A value around 4, 5 or 6 can be appropriate for GSM. For simplicity we shall restrict ourselves to the case of 4 users. Two users do not require cyclic prefix. The transmitter is identical to the transmitter of the first version defined in above, except that:

$$\vec{u}_k^{left} = [\vec{b}_k(N-L+1:N) \cdot H_m(k,2), \vec{u}_k(1:2^{m-1})],$$

and $$\vec{u}_k^{right} = [\vec{b}_k(N-L+1:N) \cdot H_m(k,2^{m-1}+2), \vec{u}_k(2^{m-1}+1:2^m)].$$

Figure 2:
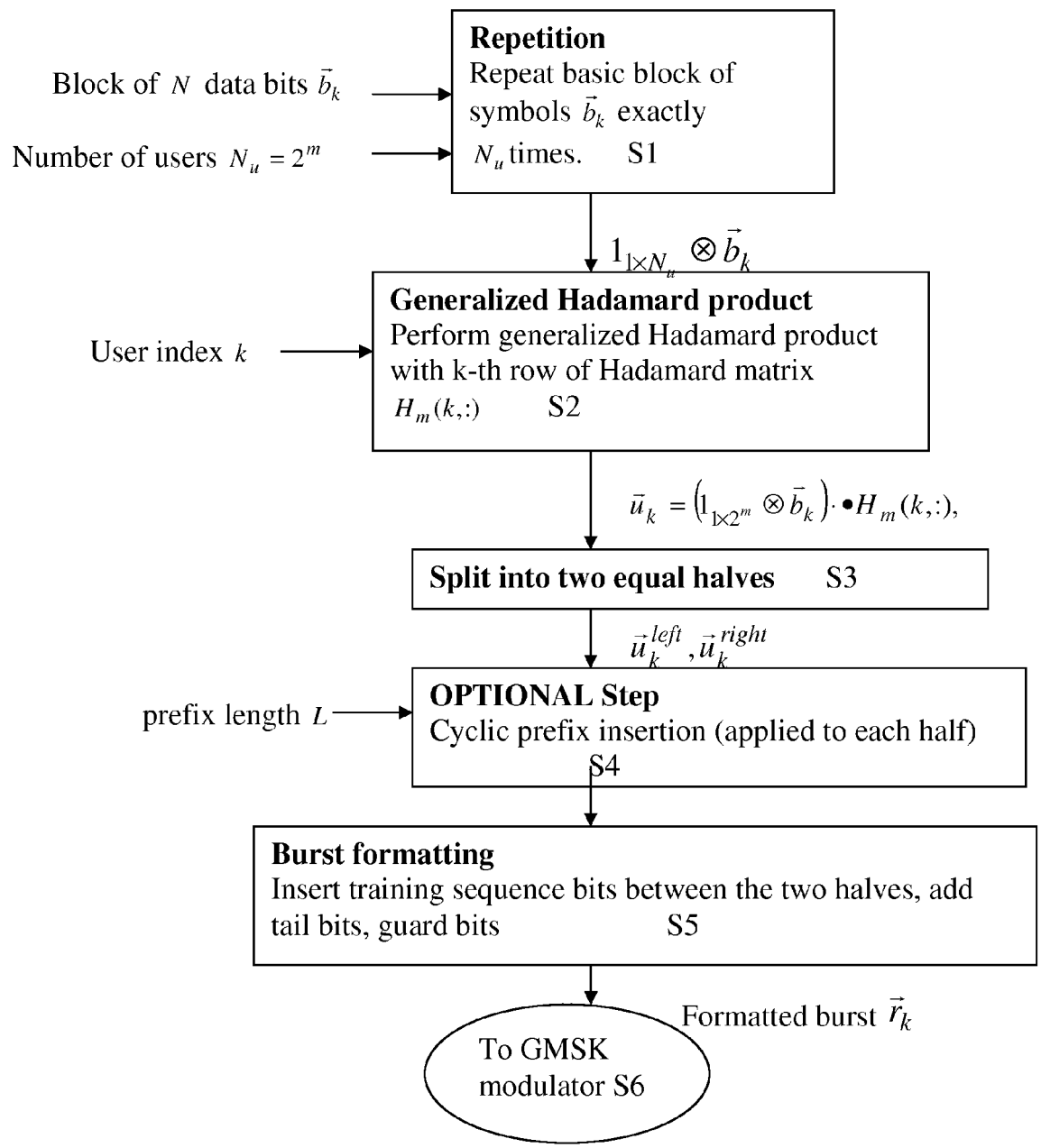
FIG. 2 is a flowchart illustrating transmitter processing.

Processing steps performed in a transmitter as described above are illustrated in FIG. 2. FIG. 2 shows the transmitter processing for one user. Each user performs similar processing. Thus, in FIG. 2 a flow chart depicting processing in a transmitter for user number k, $1 \leq k \leq N_u$ is shown.

First in a step S1 the transmitter receives as input the user specific payload bits and the total number $N_u$ of users. The output consists of $N_u$ repetitions of the input block. Each repetition can be denoted a sub-block. Repetition is equivalent to concatenation of the input with copies of itself. For example if there are 29 user specific payload bits and 4 users in total, the output consists of 116=29*4 bits, which are obtained by concatenation of 4 copies of the initial block of 29 bits.

Next in a step S2 the input is the block of repeated bits as output from step S1 and the index of the user. The user index can for example be a unique integer that identifies the user. For example if there are 4 users the user indices are in accordance with one embodiment 1, 2, 3 and 4. According to the user index, a row of a Hadamard matrix is chosen. Each user will choose a different row. Each entry in the row is either one or minus one. There are as many entries in the row as there are repeated blocks. The bits in each block will be left intact or will be flipped according to the sign of the corresponding entry. For example if the third entry in the row is a one, then the third block is left unchanged. But if the third entry in the row is a minus one, then all the bits in the third block are flipped. Thus, the output from step S2 is a modification of the input block by flipping some sub-blocks according to a row of a Hadamard matrix.

Then in a step S3, the input is the output from step S2 (i.e. the repeated, flipped, payload bits for the user) and the output is the input blocks for a user divided into two block halves of equal length. This can be useful when inserting a training sequence in the middle.

Then in a step S4 a cyclic prefix is added to each of the two halves. This step S4 is optional.

Then in a step S5 burst formatting is performed. Guard, tail and training bits are inserted, and placed in a predefined order together with the two halves of the payload bits. For example, in GSM, a GMSK normal burst is formatted as follows see also 3GPP TS 45.002 v9.5.0. Guard bits are added at the beginning, followed by tail bits, followed by the first half of the payload, then training sequence bits are added, followed by the second half of the payload bits. Finally more tail bits and guard bits are added.

Finally in a step S6 the formatted burst is sent to a modulator, in particular a GMSK modulator, such as the modulator described in 3GPP TS 45.004 v9.1.0.

Description of the Receiver

In the following description the case of one receive antenna is contemplated. Extensions to two or more antennas are straightforward. Let r(n) denote the received signal. Using the Laurent decomposition, and after de-rotation by $\pi/2$, it can be modeled as $$r(n) = \sum_{k=1}^{2^m} \sum_{i=0}^{L-1} h_k(i) s_k(n-i+m_k) + w(n),$$

for all n, where w(n) denotes the noise, $h_k(i)$ denotes the channel for user k, L denotes the number of taps (Without loss of generality it can be assumed that all channels have the same length) in $h_k$, and $m_k$ is the relative timing offset between the two users. Assume that $w(n) \sim N(0, \sigma_w^2)$, and that the channel taps $h_k(i)$ remain unchanged over each burst. The received signal model applies to both uplink and downlink. However it can be envisaged that the method of receiving signals typically will be more useful in the uplink (i.e. transmissions from a mobile station to a radio base station). In the following an exemplary embodiment of receiver processing in the case where the timing offsets $m_k$ are all equal to zero will be described. It is easy to modify the receiver to handle the general case.

Transmitted Signal with Cyclic Prefix

First, assume that a cyclic prefix has been used at the transmitter side.

Let $\beta_k(n) \equiv 1 - 2b_k(n)$ denote the payload symbols for user k, and let $n_0$ be the start of the payload symbols. In other words, $$r(n_0) = \sum_{k=1}^{2^m} \sum_{i=0}^{L-1} h_k(i)s_k(n_0 - i) + w(n), \; s_k(n_0) = \beta_k(1).$$

Let $N_t$ be the number of training bits. Split the signal over the payload into $2^m$ time blocks of length N, skipping the training sequence part, and collect them into a block matrix of dimension $2^m \times 1$.

$R = [R_1, \ldots, R_{2^m}]^T,$ where $$R_1 = r(n_0 : n_0 + N - 1),$$

$$R_2 = r(n_0 + N : n_0 + 2N - 1),$$

$$\vdots$$

$$R_{2^{m-1}} = r(n_0 + (2^{m-1} - 1)N : n_0 + 2^{m-1}N - 1),$$

$$R_{2^{m-1}+1} = r(n_0 + N_t + 2^{m-1}N : n_0 + N_t + 2^{m-1}N + N - 1),$$

$$\vdots$$

$$R_{2^m} = r(n_0 + N_t + (2^m - 1)N : n_0 + N_t + 2^mN - 1).$$

Next, apply the Hadamard transform to R, using block matrix multiplication:

$$Y = \frac{1}{2^m} H_m \cdot R.$$

For example $$Y(k) = \frac{1}{2^m} \sum_{i=1}^{2^m} H_m(k, i) R_i$$

is a vector of length N. This application of the Hadamard transform has completely separated the users. In fact, writing $Y(k) = [y_k(1), \ldots, y_k(N)]$ the following expression is valid.

$$y_k(n) = \sum_{i=0}^{L-1} h_k(i)\beta_k(n - i) + v_k(n), \; \beta_k(i) = \beta_k(N - i), \; i \leq 0,$$

where the noise term is independent, identically distributed $$v_k(n) \sim N\left(0, \frac{\sigma_w^2}{2^m}\right).$$

Thus, block-wise application of the Hadamard transform completely separates the users and reduces the noise power by $3m = 10 \log_{10}(2^m)$ dB. The color of noise is preserved since the Hadamard transform is orthogonal. The demodulation process is further illustrated in FIG. 3.

Figure 3:
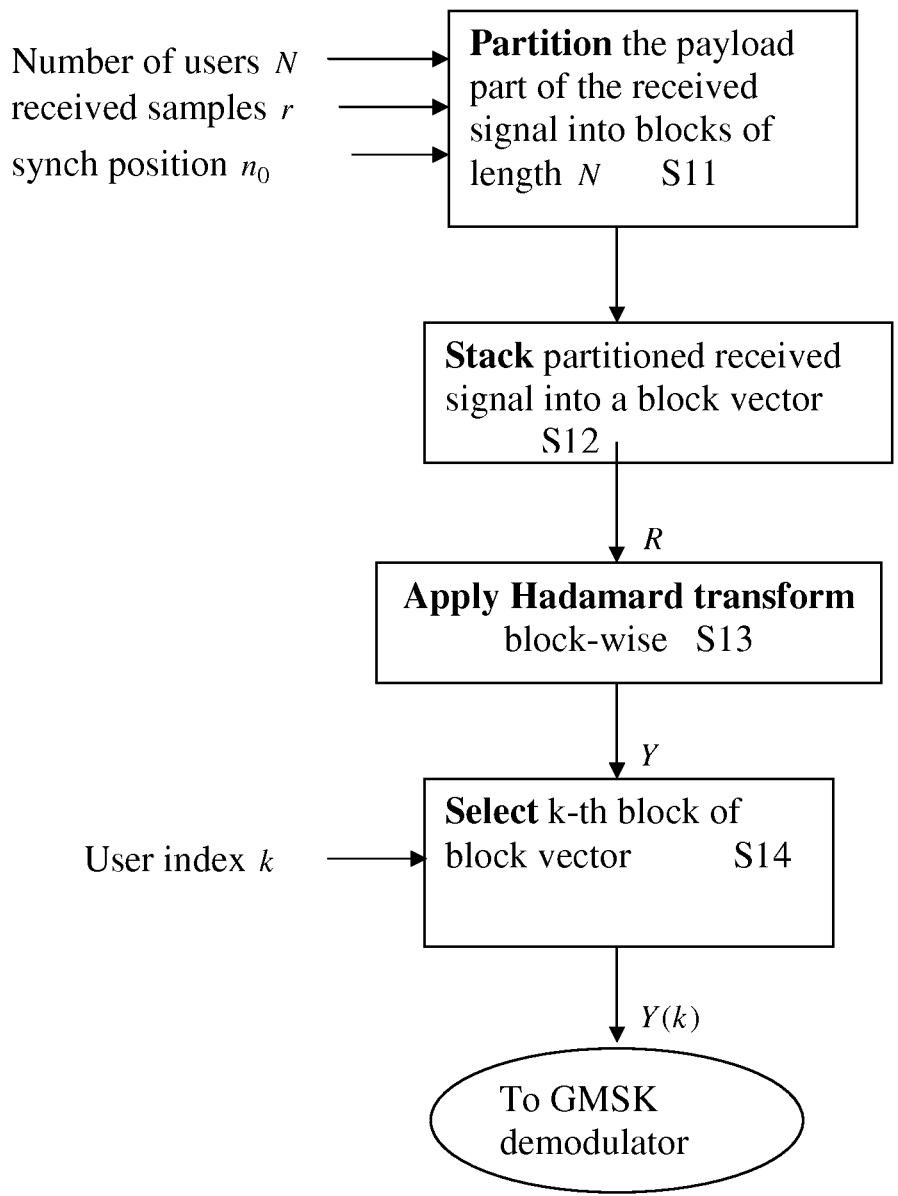
FIG. 3 is a flowchart illustrating receiver processing.

FIG. 3 illustrates some steps performed in an exemplary receiver when processing a received signal. The received signal can for example be generated using a transmitter as described herein. In the example given herein it is assumed that a cyclic prefix is used at the transmitter side. It is further assumed that the receiver is a single antenna receiver. This is typically the most challenging case for multi-user reception, and generalizations to more antenna branches are straightforward. In FIG. 3 the signals are received for user k, $1 \leq k \leq N_u$.

First, in a step S11 the input is a received digital signal, the total number of users and a hypothesized synchronization position. In step S11 the received signal is split into partitioned time blocks of equal length. There are as many blocks as there are users.

Then in a step S12 the partitioned signal is stacked to form a block vector, typically a column block vector.

Next, in a step S13, the received samples are unflipped. Unflipping is the opposite of flipping. For example a Hadamard transform is applied block-wise to the block vector of received samples. This means that the entries of the input block vector are multiplied by one or minus one (multiplication of vector and scalar is performed as usual, all entries of the vector are multiplied by the scalar, in this case either one or minus one). Thus, when unflipping the samples of a partitioned block all blocks flipped at the transmitter are multiplied by −1. The output is a block vector of the same dimensions as the input vector. To exemplify, if the row element is a +1 then leave the sub-block unchanged, if the row element is a −1 then invert the sign of all the entries in the sub-block. So this operation is quite elementary, example: subblock 1=[1 2 −3 2], subblock 2=[−2.3 0.3 1 0.1], row of Hadamard=[1 −1] then after the operation subblock 1=[1 2 −3 2], and subblock 2=[2.3 −0.3 −1 −0.1])

Next, in a step S14, one entry of the block vector is chosen according to the user index. This entry is itself a vector and contains only energy from the chosen user, while the energy from all other users has been cancelled.

Finally, in a step S15, the block of samples containing only energy from one user is sent to an ordinary modulator. In case GMSK modulation has been performed the modulator will be a GMSK demodulator.

Transmitted Signal without Cyclic Prefix

Keep the notation introduced in the previous section. Define $R = [R_1, \ldots, R_{2^m}]^T$ in a slightly different form.

$$R_1 = r(n_0 + L : n_0 + N - 1),$$

$$R_2 = r(n_0 + N + L : n_0 + 2N - 1),$$

$$\vdots$$

$$R_{2^{m-1}} = r(n_0 + (2^{m-1} - 1)N + L : n_0 + 2^{m-1}N - 1),$$

$$R_{2^{m-1}+1} = r(n_0 + N_t + 2^{m-1}N + L : n_0 + N_t + 2^{m-1}N + N - 1),$$

$$\vdots$$

$$R_{2^m} = r(n_0 + N_t + (2^m - 1)N + L : n_0 + N_t + 2^mN - 1).$$

The difference is that first L symbols in each block are omitted. Next, compute the Hadamard transform of R.

$$Y = \frac{1}{2^m} H_m \cdot R.$$

The following expression is valid:

$$y_k(n) = \sum_{i=0}^{L-1} h_k(i)\beta_k(n-i) + v_k(n), n > L.$$

As before, the users have been completely separated. Thus, it is possible to demodulate $y_k(n)$ in the backward direction to find estimates $\hat{\beta}_k(n)$, $n \geq N-L$. The tail symbols are convolved with the channel and subtracted from the received signal, and the newly estimated symbols are convolved with the channel and added to the received signal. Let $t_k(n)$ denote the tail symbols for user k (zero padded if necessary so that there are as many as there are symbol estimates $\hat{\beta}_k(n)$). For $n \geq L$ define the compensated received signal $\bar{r}(n)=r(n)$, and for $0 \leq n < L-1$ set $$\bar{r} = (n_0 + n) = r(n_0 + n) +$$

$$\sum_{k=1}^{2^m} \sum_{i=n+1}^{L-1} h_k(i)\hat{\beta}_k(N-(L+n+1-i)) - \sum_{k=1}^{2^m} \sum_{i=n+1}^{L-1} h_k(i)t_k(L+n+1-i).$$

The same procedure can be applied to the first L−2 samples after the training sequence, but subtracting the training symbols instead of the tail symbols.

Figure 4:
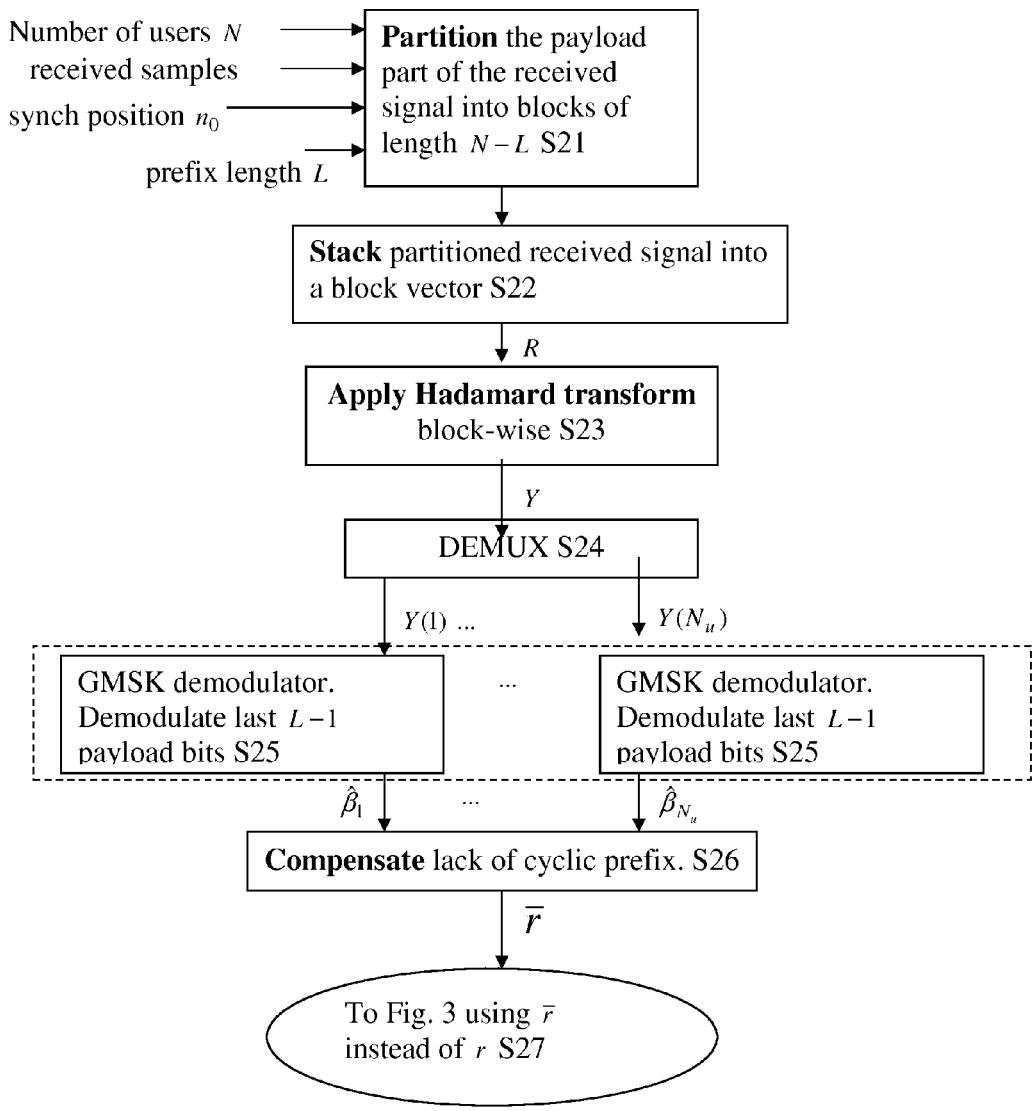
FIG. 4 is a flowchart illustrating further receiver processing.

This has the same effect as using a cyclic prefix in the transmitter, and the processing explained above can be applied to the compensated signal $\bar{r}(n)$. There can be some performance losses if there are errors in the estimates $\hat{\beta}_k(n)$. Such a demodulation process is illustrated in FIG. 4. FIG. 4 illustrates some steps performed in an exemplary receiver when processing a received signal not having a cyclic prefix. In FIG. 4 the signals are received for user k, $1 \leq k \leq N_u$.

In FIG. 4 the receiver side processing for one user, in case a cyclic prefix is not used at the transmitter is illustrated. The exemplary processing in FIG. 4 assumes a single antenna receiver. This is typically the most challenging case for multi-user reception, and generalizations to more antenna branches are straightforward.

First in a step S21 the input is a received digital signal, the total number of users and a hypothesized synchronization position. In step S21, the received signal is split into partitioned time blocks of equal length. There are as many blocks as there are users. However, the first samples of each block are discarded. In one exemplary embodiment as many samples as there are channel taps are discarded.

Next, in a step S22, the partitioned signal is stacked to form a block vector, typically a column block vector can be formed.

Then, in a step S23, a Hadamard transform is applied block-wise to the block vector of received samples. This means that the entries of the input block vector are multiplied by one or minus one (multiplication of vector and scalar is performed as usual, all entries of the vector are multiplied by the scalar, in this case either one or minus one.) The output is a block vector of the same dimensions as the input vector.

Then, in a step S24, each entry of the block vector is picked and sent to an ordinary demodulator. For example if the received signal is modulated using a GMSK modulator the demodulator can be GMSK demodulator.

Next, in a step S25, all user signals are demodulated in parallel. The output of the modulation in step S25 yields estimates for the last bits in each block.

Then, in a step S26, the estimated bits for all users are used to compensate for the lack of cyclic prefix. In this way the received signal can be modified and it will appear as if a cyclic prefix was introduced at the transmitter.

Finally, in a step S27, the modified received signal, compensated by the lack of cyclic prefix, is sent to the receiver illustrated in FIG. 3 using the modified received signal instead of the received signal in FIG. 3. It is to be noted that the bits that have been demodulated in Step 25 need not be demodulated again.

General Non-Linear Continuous Phase Modulation

So far the examples given have focused on signals that are GMSK modulated. However, the techniques described herein can be applied to other types of differentially encoded continuous phase modulated (CPM) signals, of which GMSK is an example. The carrier phase of a CPM signal is of the form:

$$\varphi(t'; \vec{d}) = \Sigma_i \alpha_i \pi h \int_{-\infty}^{t'-iT} p(u)du,$$

where $\alpha_k$ is a sequence of binary information symbols, h is the modulation index and p is the transmit pulse. Examples of CPM include Gaussian Minimum Shift Keying (GMSK), minimum-shift keying (MSK), continuous phase frequency shift keying (CPFSK) and many more. The generalization to other CPM signals is straightforward.

EXAMPLES

As an illustration, the principles described herein can be applied to a system resembling GSM. A single antenna branch receiver is assumed. The following are the simulation parameters.

m=2
$N_u=2^m=4$ users
N=29 (number of payload bits per user)
$N_t$=26 (number of training bits)
L=6 (number of cyclic prefix bits)
900 MHz band.

The contribution of the thermal noise to the received signal has been omitted from the plots in order to illustrate clearly the transmitter and receiver algorithms.

The simulation results are shown in FIG. 5 to FIG. 12. The average power of every user is 0 dB. Several propagation environments have been simulated. TUx, HTx and RAx are the usual abbreviations for Typical Urban, Hilly Terrain, Rural Area at a speed of x km/h. It can be seen that at low speeds the sub-channels are, for practical purposes, orthogonal, and separation of the users is possible. At high speeds the users are no longer truly orthogonal and a noise floor is introduced. This may affect the performance of the demodulator. On the other hand, the separation algorithm also reduces the thermal noise power by 6 dB.

Figure 5:
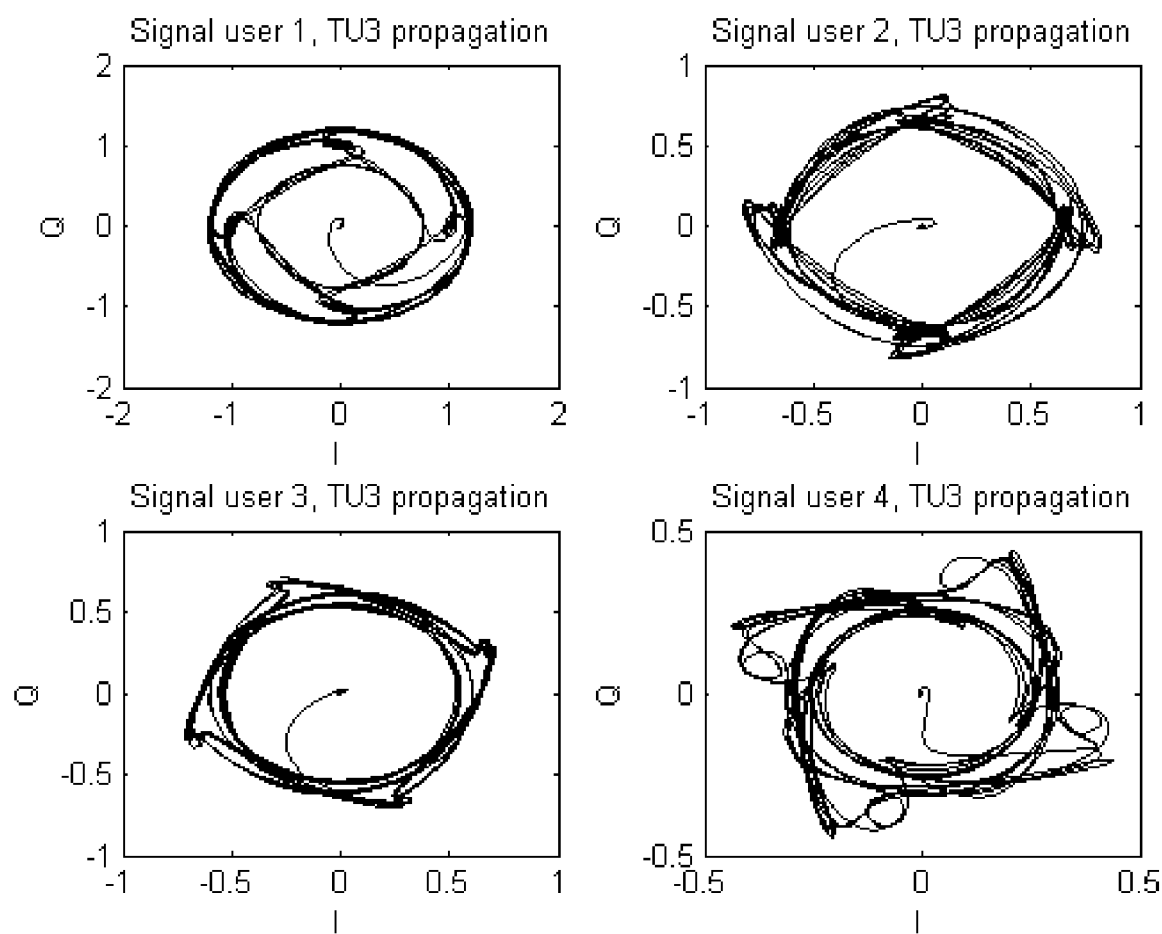
FIGS. 5-13 are plots illustrating simulation results.
Figure 6:
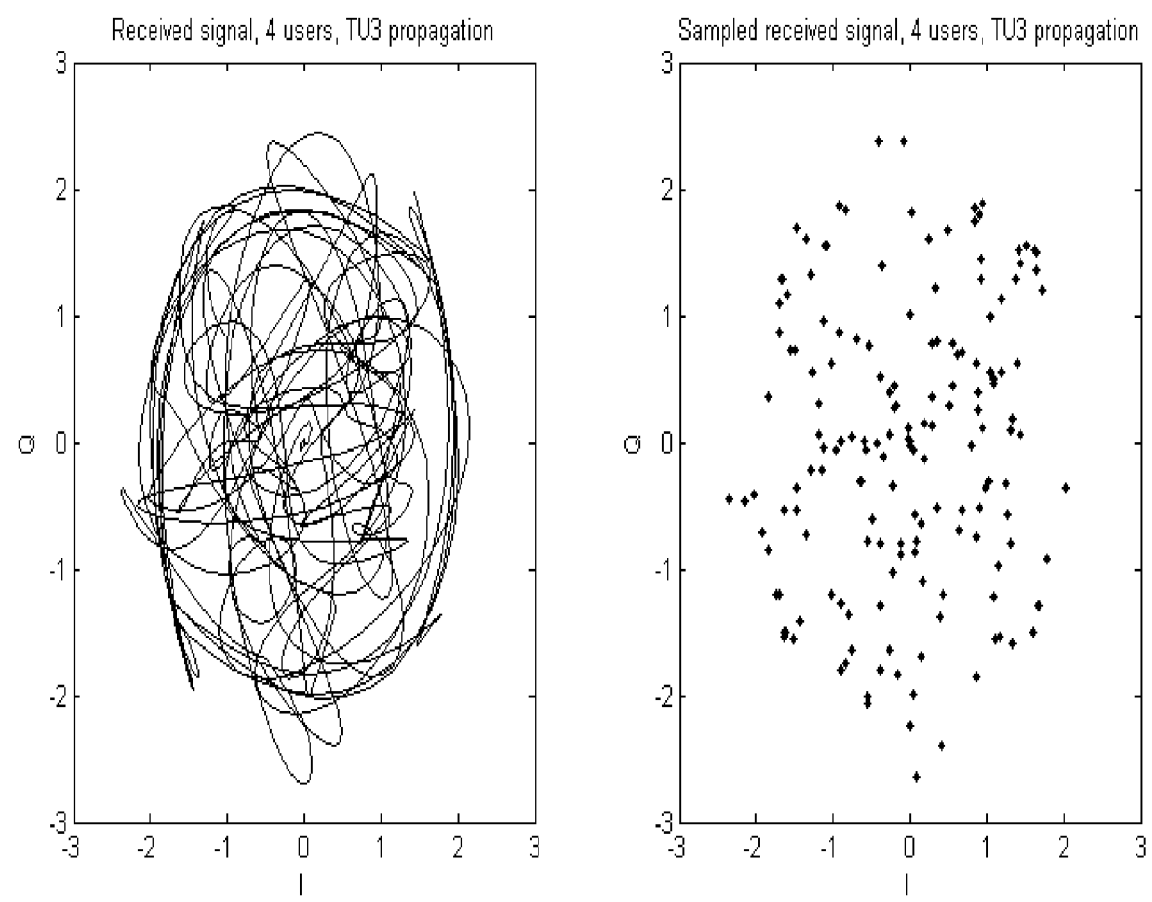
Figure 7:
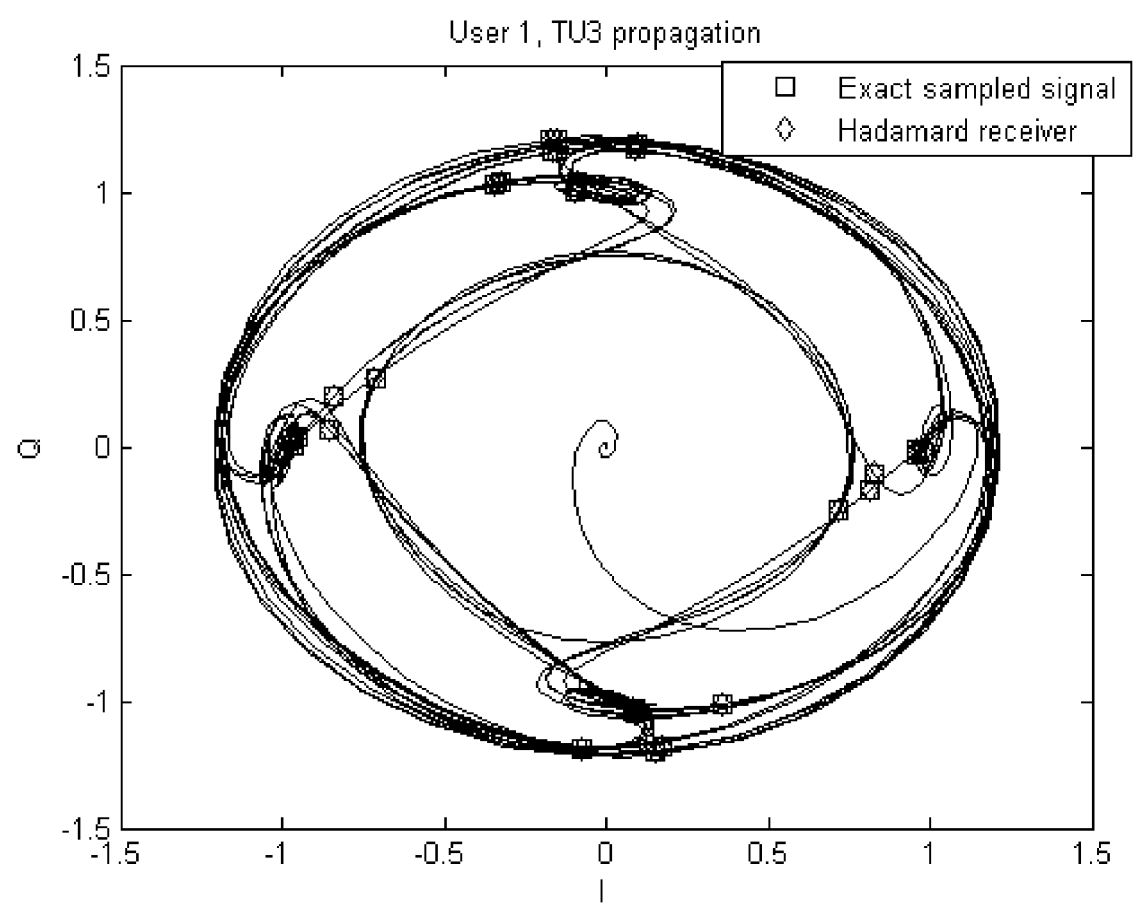
Figure 8:
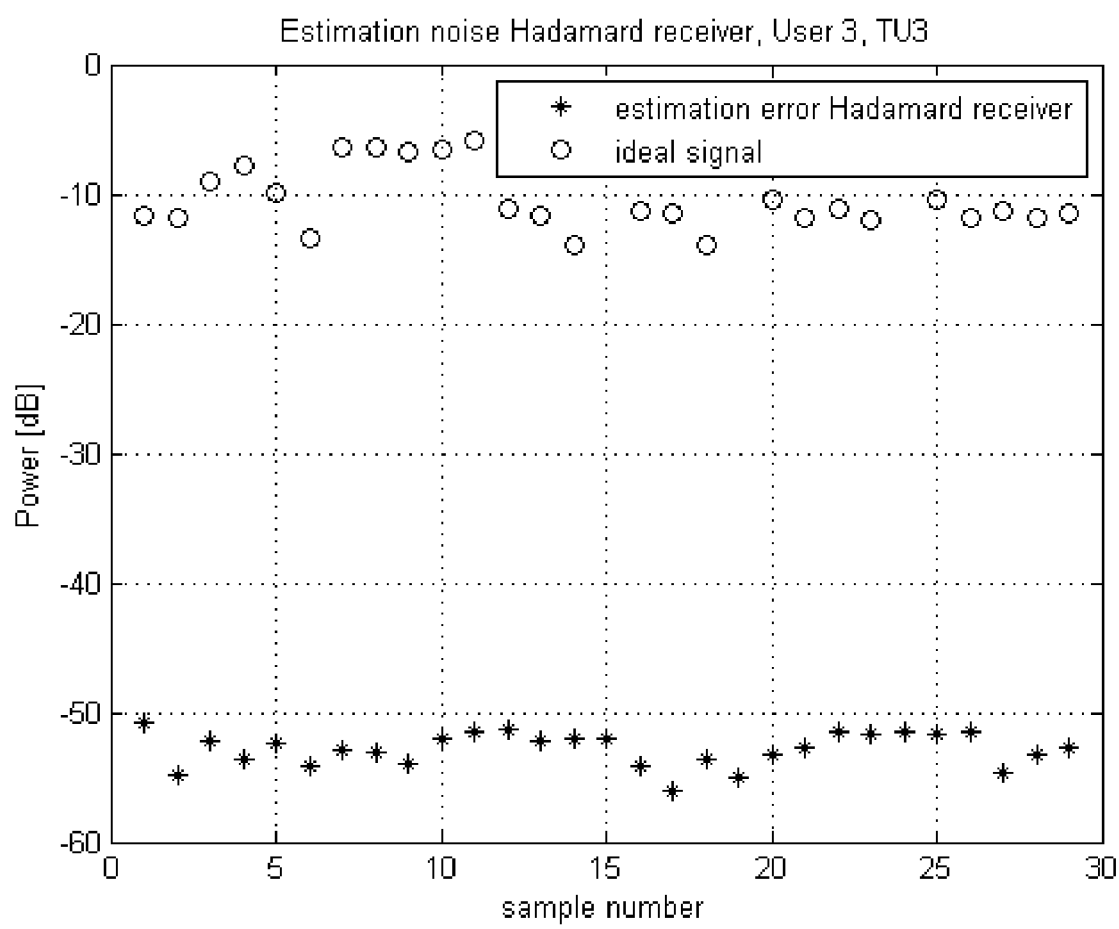
Figure 9:
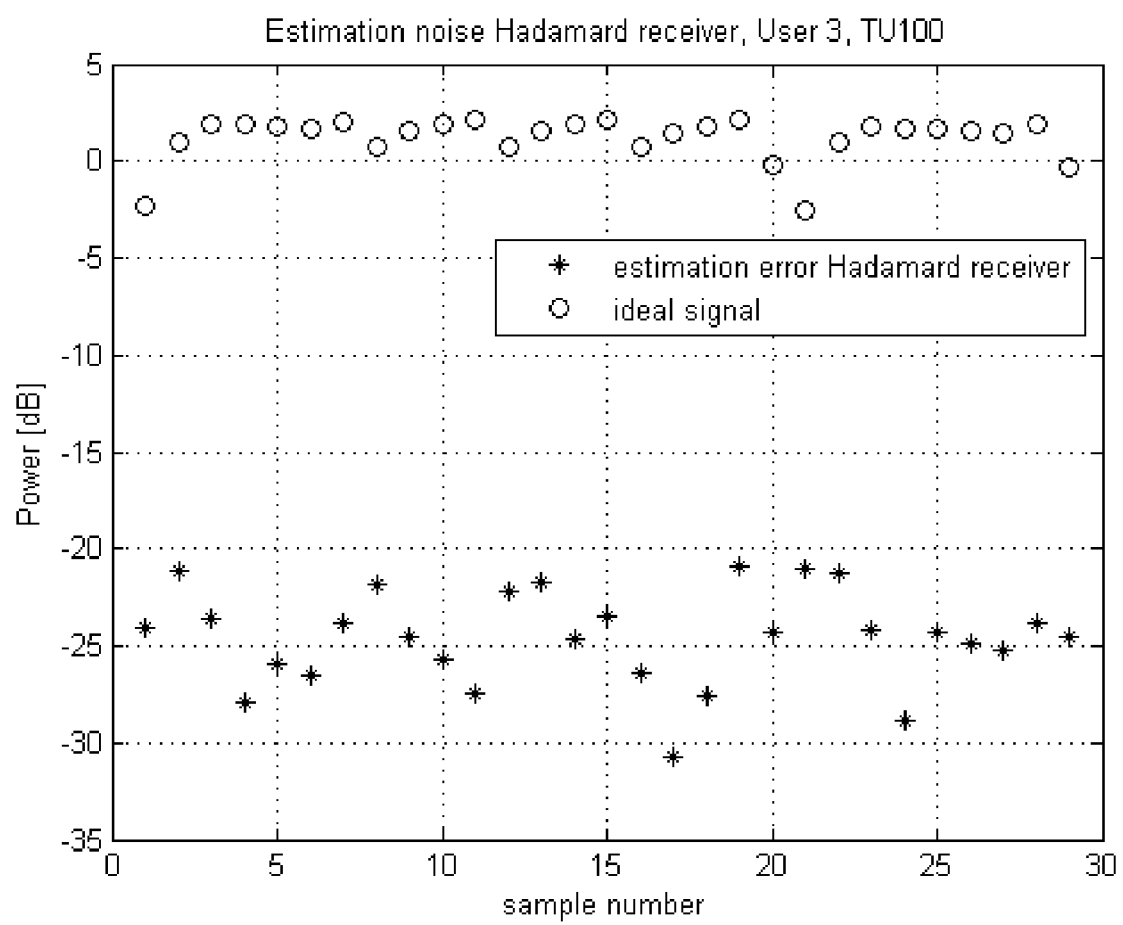
Figure 10:
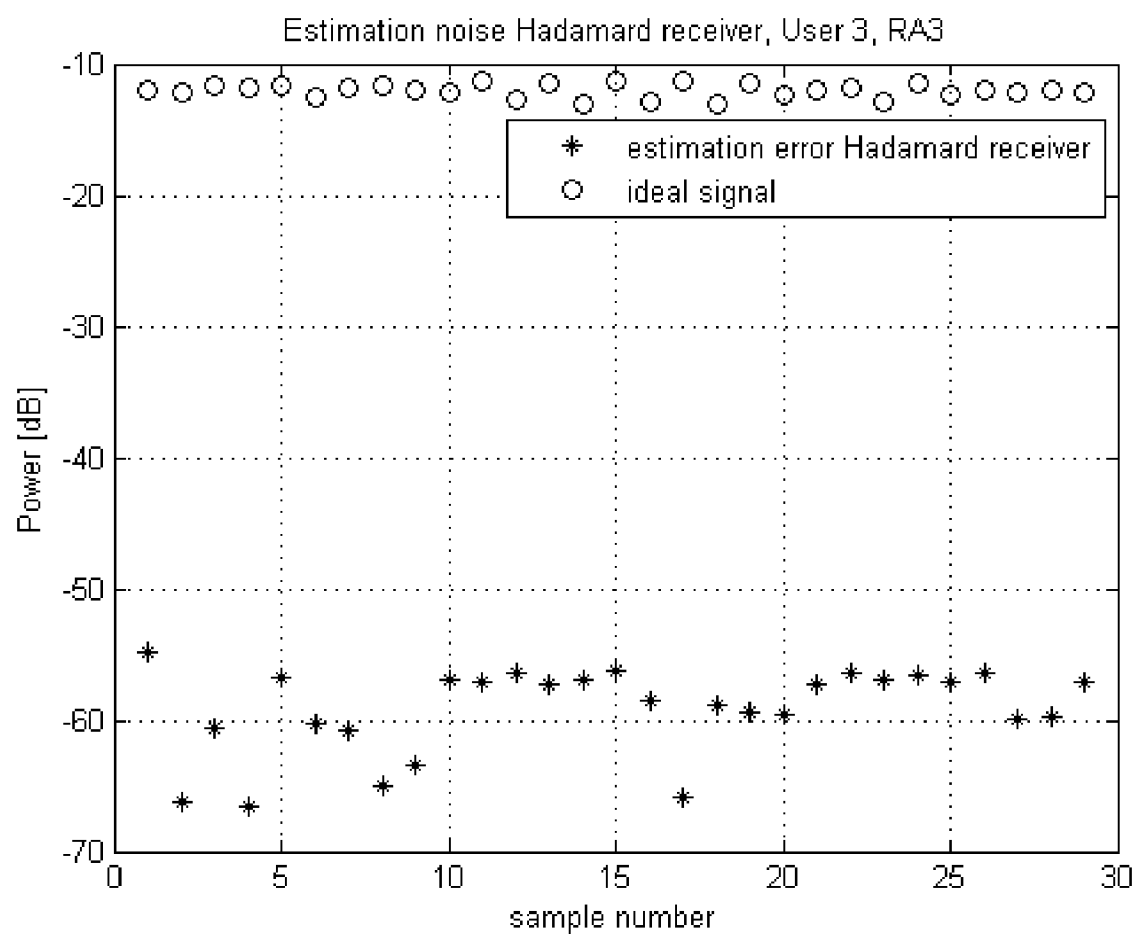
Figure 11:
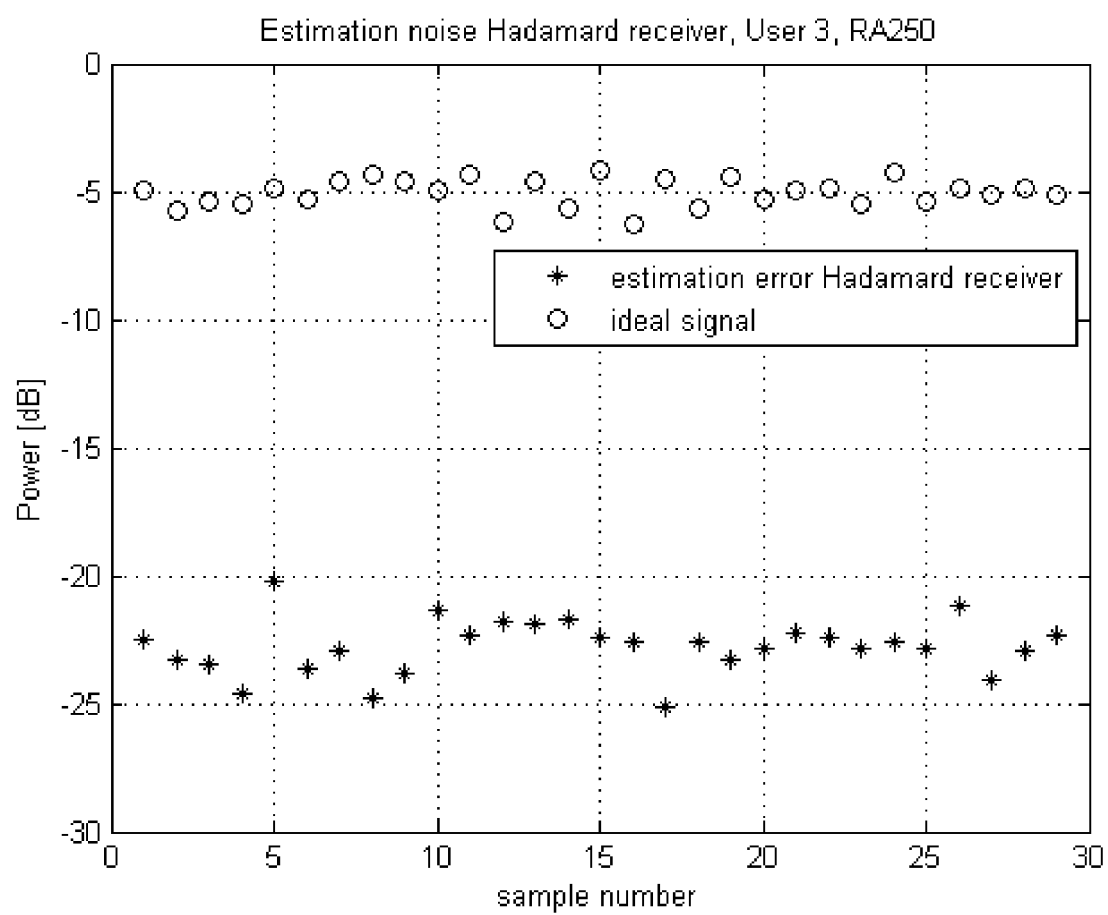
Figure 12:
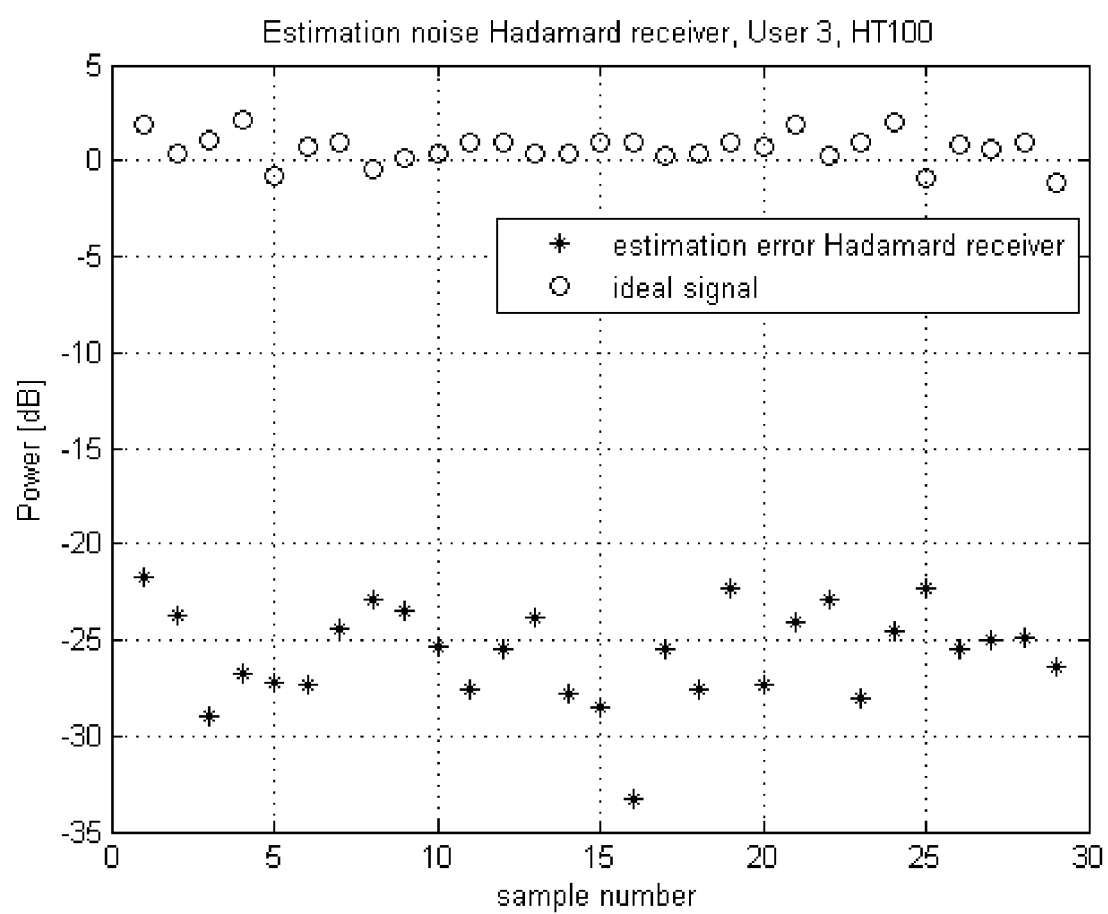
Figure 13:
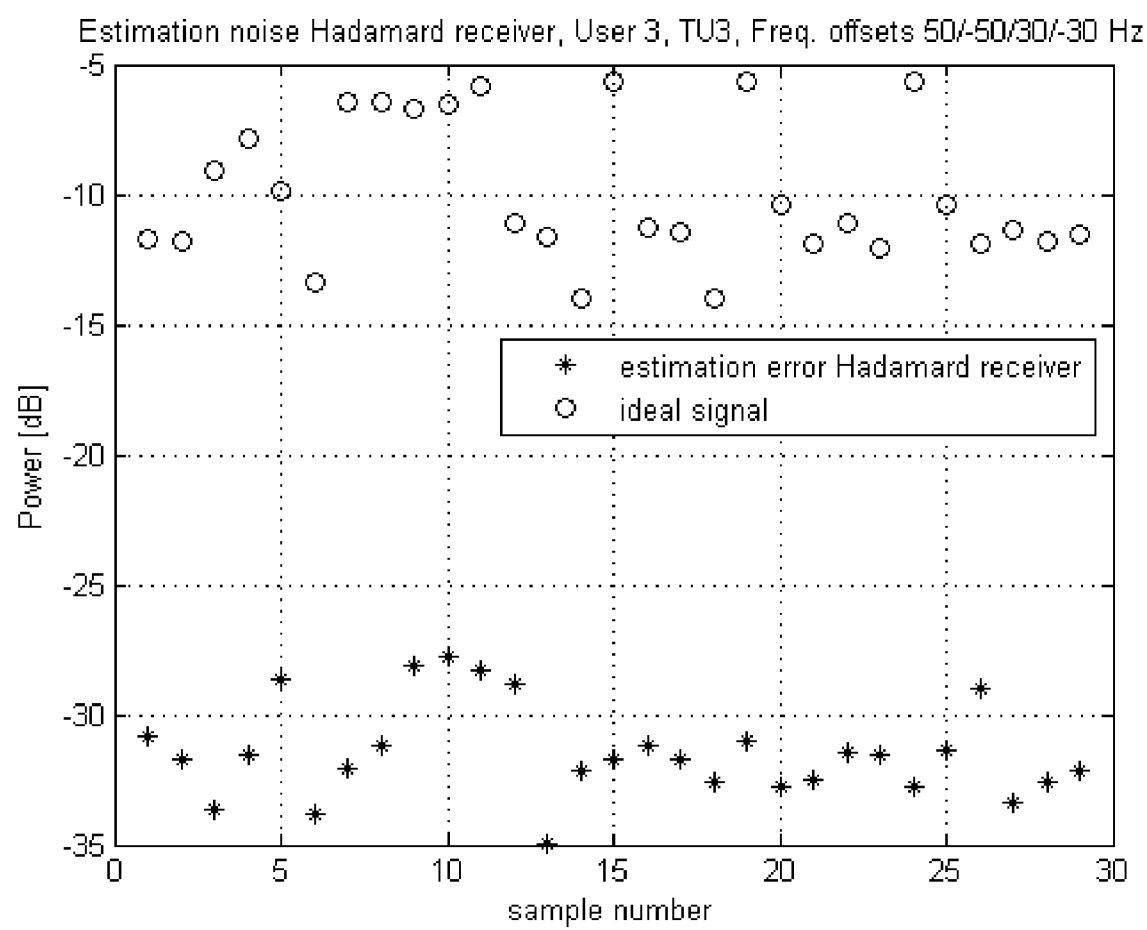

FIG. 5 shows all the user signals separately, including Rx filtering in the receiver. Thus, FIG. 5 shows baseband signals for 4 users undergoing independent fading. It is meant for illustrative purposes only; the signals do not exist individually after the transmitters have emitted the electromagnetic waves. FIG. 6 depicts the received signal, without any thermal noise. It is obtained by the superposition of the 4 signals in FIG. 5. The signal sampled at the symbol rate is also shown. This is the digital signal that is fed to the user separation algorithm. FIG. 7 shows the ideal and estimated I and Q components of the digital signal for one of the users. FIGS. 8-13 illustrate the estimation error introduced by the user separation algorithm. "Hadamard receiver" refers to the method described herein.

Unequal Sub-Channel Bandwidth

The above transmission techniques all divide the available channel bandwidth equally between the sub-channels of the different users in the same slot. In some cases it can be envisaged that a greater flexibility would be advantageous. To address this need the possibility to divide the available channel bandwidth unequally between the sub-channels can be added. The technique described above creates $2^m$ orthogonal sub-channels, each sub-channel constituting $\frac{1}{2^m}$ of the available channel bandwidth in a slot.

In some embodiments, sub-channels constituting $2^n/2^m$ of the available bandwidth are created, where n is user specific and $1 \leq n \leq m$. For instance, if $2^m = 8$, it is possible to create sub-channels constituting $\frac{1}{8}$, $\frac{1}{4}$ or $\frac{1}{2}$ of the bandwidth. This is done as follows:

In embodiments described above for equal channel bandwidth, a vector of bits $\vec{b}_k$ to be transmitted by user k was repeated $2^m$ times and subsequently multiplied by the $k^{th}$ row of a Hadamard matrix. In embodiments describe hereinafter, $2^{n_k}$ vectors of bits $$\vec{b}_{k,1}, \ldots, \vec{b}_{k,2^{n_k}}$$

to be transmitted by user k are concatenated, repeated $2^{m-n_k}$ times and subsequently multiplied by row $\rho_k$ of the Hadamard matrix. In all other aspects, the transmitter can be the same as described above.

On the receiver side, the receiver as described above for equal bandwidth is configured so that the received signal is split into $2^m$ time blocks, and the time blocks collected into a block matrix. To separate the signal of user k, the block matrix is multiplied by the $k^{th}$ row of the Hadamard matrix used in the transmitter. In a case with unequal bandwidth, the block matrix is further divided into $2^{n_k}$ block matrices corresponding to the $2^{n_k}$ transmitted vectors (the division is user-specific and is defined by the order the vectors are transmitted). Each block matrix is multiplied to a sub-vector of row $\rho_k$ of the Hadamard matrix to separate each transmitted vector of user k from the signals of the other users.

The ratio $2^{n_k}/2^m$ will here be denoted the sub-channel rate. The sub-channel rate may be different for different users. The methods in the transmitter and receiver for a given user k depend only on the rate of that user, not on the rate of the other users. Despite this, orthogonality is maintained between the sub-channels as long as the total rate sums up to 1 (or less) and the set of rows of the Hadamard matrix to use in the transmitter/receiver is selected wisely as will be described below.

Transmitter for Unequal Sub-Channel Bandwidth

The following notation will be used. The symbol $\otimes$ denotes the Kronecker product, $1_{M \times N}$ is a matrix of ones of size M×N, and we use the Matlab shorthand A(k,:) or A(k,m:n) to denote a row or a slice of a row of the matrix A.

Two variants of the transmitter shall be given.

Transmitter, First Version

Let $N_v = 2^m$ (for some m>0) be the multiplexing order of the channel. This number gives the number of vectors of N payload bits to be transmitted during a burst. If the sub-channel rate is $\frac{1}{2^m}$ for all users, the multiplexing order is equal to $N_u$, the number of users sharing the channel, but in general $N_u \leq N_v$. Let $$\vec{b}_{k,1}, \ldots, \vec{b}_{k,2^{n_k}}$$

be the $2^{n_k}$ vectors of payload bits for user k. In order to avoid degenerate cases where there is just one user, it is assumed that $n_k < m$. Further, let $\vec{t}_k^{left}$, $\vec{t}_k^{right}$ be the vectors of left and right tail bits and $\vec{s}_k$ be the vector of training sequence bits. The bit flip operation and the generalized Hadamard matrix product (denoted • and •• respectively) are defined as above.

Define $$\vec{u}_k = (1_{1 \times 2m-n_k} \otimes [\vec{b}_{k,1}, \ldots, \vec{b}_{k,2^{n_k}}]) \cdot H_m(\rho_k, :),$$
$$\vec{u}_k^{left} = \vec{u}_k(1:2^{m-1}),$$
$$\vec{u}_k^{right} = \vec{u}_k(2^{m-1} + 1:2^m),$$
$$\vec{r}_k = [\vec{t}_k^{left}, \vec{u}_k^{left}, \vec{s}_k, \vec{u}_k^{right}, \vec{t}_k^{right}].$$

That is, the formatted burst for user k consists of tail bits, training sequence bits and $2^{m-n_k}$ repetitions of the block of payload bits $$[\vec{b}_{k,1}, \ldots, \vec{b}_{k,2^{n_k}}],$$

each vector being modified by bit flip according to the sign of the entries in row $\rho_k$ of the Hadamard matrix.

When more than one vector of payload bits is transmitted by a user in this manner ($2^{n_k} > 1$) using row $\rho_k$ of the Hadamard matrix, orthogonality is lost to some of the other sub-channels (corresponding to other rows in the Hadamard matrix). For instance, if $2^{n_k} = 2$, there will be one other row that is not orthogonal to row $\rho_k$, while if $2^{n_k} = 4$, there will be three other rows that are not orthogonal to row $\rho_k$. In general, there will be $2^{n_k} - 1$ rows non-orthogonal to $\rho_k$. These should not be used by other users. The dependencies between the rows can be described by a tree structure. This is exemplified in FIG. 16 for the Hadamard matrix $H_3$ above with $2^m = 8$.

Figure 16:
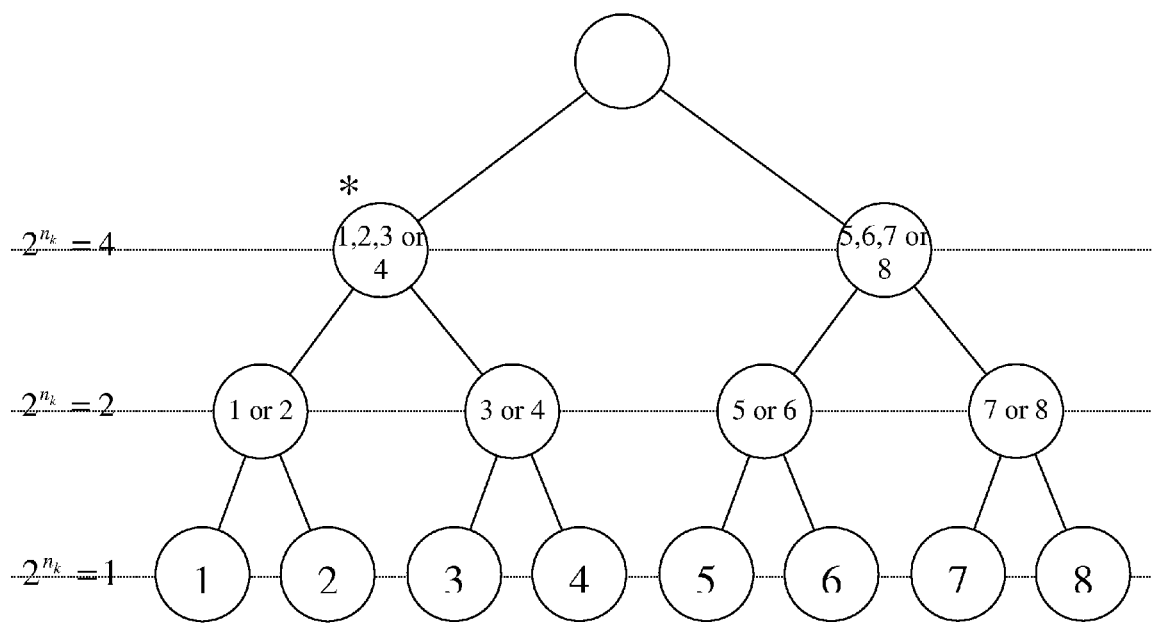
FIG. 16 is a view of a tree structure.

In FIG. 16, the numbers in the nodes denote matrix row numbers $r_k$. The horizontal dotted lines denote the number of vectors of payload bits transmitted by a user ($2^{n_k}$). For instance, if user k transmits $2^{n_k} = 4$ vectors of payload bits using $\rho_k = 2$, this corresponds to the node marked with *. All nodes below this node should then be left unused to maintain orthogonality. In other words, $\rho_k = 1, 2, 3, 4$ are not used by any other user.

In general, if the multiplexing order is $2^m$ and row $\rho_k$ is used with sub-channel rate $2^{n_k}/2^m$, all rows $\rho_l \neq \rho_k$ that satisfy $\rho_l - 1 = \rho_k - 1 \text{ div } 2^{n_k}$ should be left unused to maintain orthogonality.

In summary, introducing varying sub-channel rates constrains the Hadamard matrix row selection for each user. The constraints, which depend on the sub-channel rate, as illustrated in FIG. 16, ensure that there will be orthogonality among different users.

In all other aspects, the transmitter can be the same as for a transmitter described above in conjunction with FIG. 2.

Example 1

A first example will now be given that illustrates the teachings for unequal sub-channel bandwidth. In this example a total of 4 users are multiplexed together using multiplexing order 8, creating one sub-channel of rate ½, one sub-channel of rate ¼ and two sub-channels of rate ⅛.

Assume the total number of users $N_u=4$, that m=3, and that $n_1=0$, $n_2=2$, $n_3=1$, $n_4=0$. The row selection for the Hadamard matrix can be performed in the following way.

1. For the first user, k=1, $2^{n_1}=1$, and any row of the Hadamard matrix can be chosen. Say $\rho_1=1$. The remaining rows available are 2, 3, ..., 8.
2. For the second user k=2, $2^{n_2}=4$. Therefore, from FIG. 16 it is seen that rows 1, 2, 3 or 4 can't be chosen, since user 1 has already been assigned row 1. Any row from 5 to 8 can be assigned to user 2. Say $\rho_2=5$. The remaining rows available are 2, 3 and 4.
3. For the third user, $2^{n_3}=2$. From FIG. 16 it is seen that only rows 3 or 4 can be assigned. Say $\rho_3=3$. The only remaining row available is row 2.
4. For the fourth user k=4, $2^{n_4}=1$. It assigned the only row available $\rho_3=2$. There aren't any remaining rows available, no more users can be multiplexed together.

The row selection is summarized in the table below.

TABLE 1

Example of row selection for the Hadamard matrix $H_3$.

| k | $n_k$ | $2^{m-n_k}$ | $2^{n_k}$ | $\rho_k$ | Sub-channel rate |
|---|---|---|---|---|---|
| 1 | 0 | 8 | 1 | 1 | 1/8 |
| 2 | 2 | 2 | 4 | 5 | 1/2 |
| 3 | 1 | 4 | 2 | 3 | 1/4 |
| 4 | 0 | 8 | 1 | 2 | 1/8 |

The formatted bursts $\vec{r}_1, \ldots, \vec{r}_4$ for users 1 to 4 would look as follows.

$$\vec{r}_1=[\vec{t}_k^{left}, +1\cdot\vec{b}_{1,1}, +1\cdot\vec{b}_{1,1}, +1\cdot\vec{b}_{1,1}, +1\cdot\vec{b}_{1,1}, \vec{s}_{1}, +1\cdot\vec{b}_{1,1}, +1\cdot\vec{b}_{1,1}, +1\cdot\vec{b}_{1,1}, +1\cdot\vec{b}_{1,1}, \vec{t}_k^{right}],$$

$$\vec{r}_2=[\vec{t}_k^{left}, +1\cdot\vec{b}_{2,1}, +1\cdot\vec{b}_{2,2}, +1\cdot\vec{b}_{2,3}, +1\cdot\vec{b}_{2,4}, \vec{s}_{2}, -1\cdot\vec{b}_{2,1}, -1\cdot\vec{b}_{2,2}, -1\cdot\vec{b}_{2,3}, -1\cdot\vec{b}_{2,4}, \vec{t}_k^{right}],$$

$$\vec{r}_3=[\vec{t}_k^{left}, +1\cdot\vec{b}_{3,1}, +1\cdot\vec{b}_{3,2}, -1\cdot\vec{b}_{3,1}, -1\cdot\vec{b}_{3,2}, \vec{s}_{3}, +1\cdot\vec{b}_{3,1}, +1\cdot\vec{b}_{3,2}, -1\cdot\vec{b}_{3,1}, -1\cdot\vec{b}_{3,2}, \vec{t}_k^{right}],$$

$$\vec{r}_4=[\vec{t}_k^{left}, +1\cdot\vec{b}_{4,1}, -1\cdot\vec{b}_{4,1}, +1\cdot\vec{b}_{4,1}, -1\cdot\vec{b}_{4,1}, \vec{s}_{4}, +1\cdot\vec{b}_{4,1}, -1\cdot\vec{b}_{4,1}, +1\cdot\vec{b}_{4,1}, -1\cdot\vec{b}_{4,1}, \vec{t}_k^{right}],$$

where all the vectors of bits $\vec{b}_{k,m}$, which contain the payload for the users, have the same length.

Example 2

A simplification of the receiver processing can be achieved by adding a cyclic prefix at beginning of each half burst. Let L≥0 be the length of the cyclic prefix. It is a design parameter. A value around 4, 5 or 6 should be appropriate for GSM. For the case $2^m=4$, a cyclic prefix is added to each burst half. The transmitter is identical to the transmitter for example 1, except that $$\vec{u}_k^{left}=[\vec{u}_k(2)(N-L+1:N)\vec{u}_k(1:2)],$$

and $$\vec{u}_k^{right}=[\vec{u}_k(4)(N-L+1:N)\vec{u}_k(3:4)].$$

For the case of $2^{n_k}=1$, this is identical to what is described above for a transmitter with equal sub-channel bandwidth. The notion $\vec{u}_k(i)(j)$ is here used to denote the $j^{th}$ element of the $i^{th}$ vector in the block vector $\vec{u}_k$.

In general, it is typically necessary to add a cyclic prefix before every second transmitted bit vector, i.e., $$\vec{u}_k^{left}=[\vec{u}_k(2)(N-L+1:N)\vec{u}_k(1:2)\ldots$$
$$\vec{u}_k(2^{m-1})(N-L+1:N)\vec{u}_k(2^{m-1}-1:2^{m-1})]$$

and $$\vec{u}_k^{right}=[\vec{u}_k(2^{m-1}+2)(N-L+1:N)\vec{u}_k(2^{m-1}+1:2^{m-1}+2)\ldots\vec{u}_k(2^m)(N-L+1:N)\vec{u}_k(2^m-1:2^m)]$$

Figure 17:
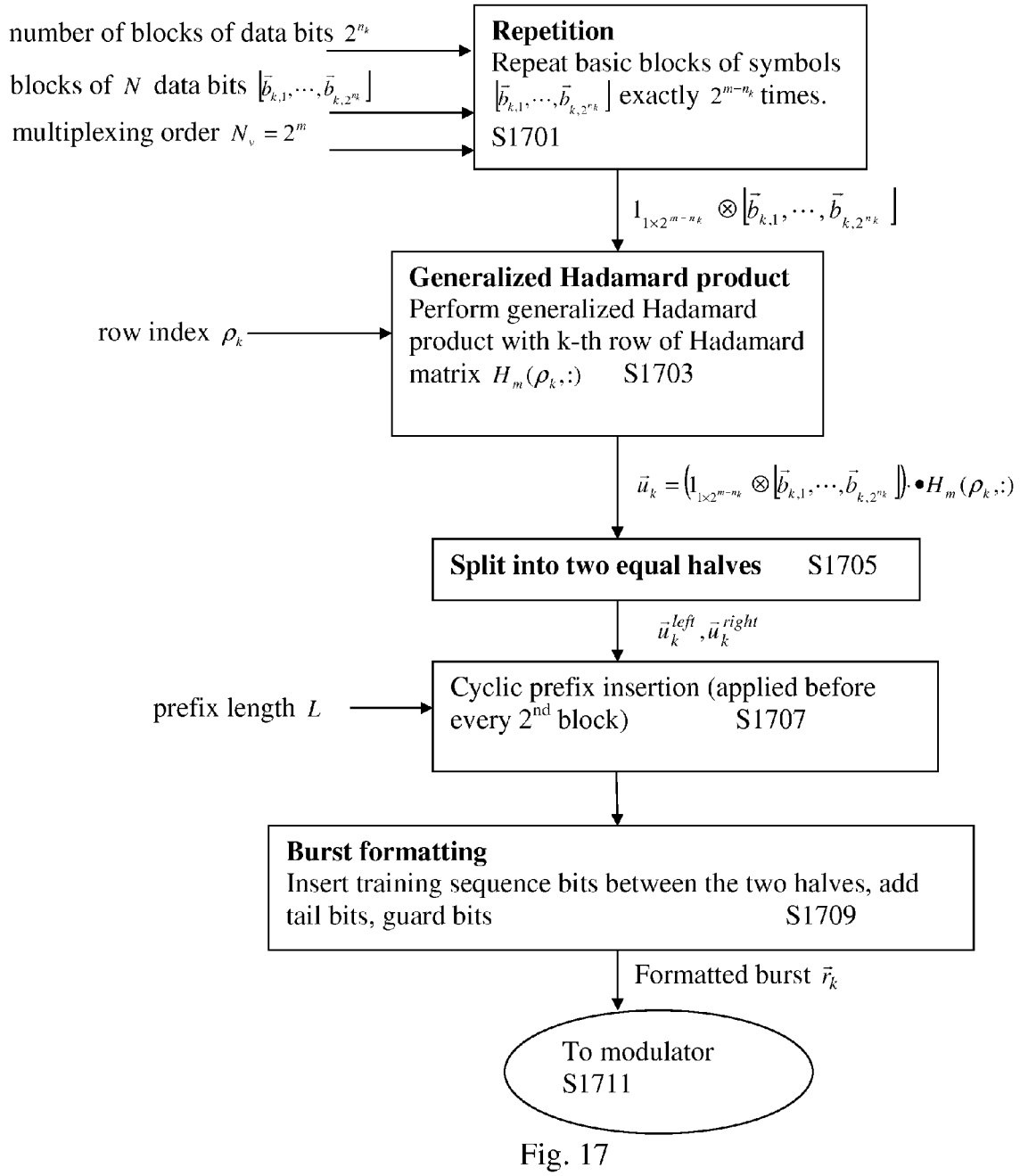
FIG. 17 is a flowchart illustrating transmitter processing.

The processing steps of such an exemplary transmitter is illustrated in FIG. 17.

FIG. 17 shows exemplary transmitter processing steps performed by on user for one user. Each user using the same channel performs similar processing.

First in a step S1701 the transmitter receives as input the $2^{n_k}$ blocks of user specific payload bits and the multiplexing order $N_v$. In step S1701 the input blocks are repeated such that the output from step S1701 consists of $2^{m-n_k}$ repetitions of the input blocks. Repetition is here equivalent to concatenation of the input with copies of itself. For example if $2^{n_k}=2$, there are 2*29 user specific payload bits and the multiplexing order is 4, the output consists of 116=(2*29)*2 bits, which are obtained by concatenation of 2 copies of the initial block of 2*29 bits.

The output from step S1701 is fed to a step S1703. Step S1703 takes as input the block of repeated bits and the row index. According to the row index, a row of a Hadamard matrix is chosen. Each user will choose a different row. In accordance with one embodiment the row index to be used for each user needs to be selected depending on the sub-channel rates for all users. Each entry in the row is either one or minus one. There are as many entries in the row as there are blocks of bits. The bits in each block will be left intact or will be flipped according to the sign of the corresponding entry. For example if the third entry in the row is a one, then the third block is left unchanged. But if the third entry in the row is a minus one, then all the bits in the third block are flipped. In summary, step S1703 modifies the input block by bit flipping some sub-blocks according to a row of a Hadamard matrix.

The output from step S1703 is fed to a step S1705. Step S1705 takes as input the repeated, flipped, payload bits for the user and divides them into two halves of equal length.

In an optional step S1707 a cyclic prefix before every second block.

In a step S1709 performs burst formatting is performed, Guard, tail and training bits are inserted, and placed in a predefined order together with the two halves of the payload bits. For example, in GSM, a GMSK normal burst is formatted as follows, see 3GPP TS 45.002 v9.5.0. Guard bits are added at the beginning, followed by tail bits, followed by the first half of the payload, then training sequence bits are added, followed by the second half of the payload bits. Finally more tail bits and guard bits are added.

Finally in a step S1711 the formatted burst to a modulator For example to a GMSK modulator as described in 3GPP TS 45.004 v9.1.0.

Receiver for Unequal Sub-Channel Bandwidth

The following description will be restricted to the case of one receive antenna. Extensions to two or more antennas are straightforward. Let r(n) denote the received signal. Using the Laurent decomposition, and after de-rotation by $\pi/2$, it can be modeled as $$r(n) = \sum_{k=1}^{N_u} \sum_{i=0}^{L-1} h_k(i) s_k(n-i+m_k) + w(n),$$

for all n, where w(n) denotes the noise, $s_k(n)$ are BPSK transmitted symbols for user k, $h_k(i)$ denotes the channel for user k, L denotes the number of taps (without loss of generality it can assume that all channels have the same length) in $h_k$, and $m_k$ is the relative timing offset between the users. Assume that $w(n) \sim N(0, \sigma_w^2)$, and that the channel taps $h_k(i)$ remain unchanged over each burst. The received signal model applies to both uplink and downlink, though the method as described herein is perhaps more useful in the uplink. The receiver processing necessary in the case where the timing offsets $m_k$ are all equal to zero will be described in this example. The receiver can be modified to handle the general case.

Transmitted Signal with Cyclic Prefix

First, it is assumed that a cyclic prefix has been used at the transmitter side.

Let $\beta_k(n) \equiv 1 - 2b_k(n)$ denote the payload symbols for user k, and let $n_0$ be the start of the payload symbols. In other words, $$r(n_0) = \sum_{k=1}^{N_u} \sum_{i=0}^{L-1} h_k(i) s_k(n_0 - i) + w(n), \; s_k(n_0) = \beta_k(1).$$

Let $N_t$ be the number of training bits. Split the signal over the payload into $2^m$ time blocks of length N, skipping the training sequence part, and collect them into a block matrix of dimension $2^m \times 1$.

$$R = [R_1, \ldots, R_{2^m}]^T,$$

where $$R_1 = r(n_0 : n_0 + N - 1),$$

$$R_2 = r(n_0 + N : n_0 + 2N - 1),$$

$$\vdots$$

$$R_{2^{m-1}} = r(n_0 + (2^{m-1} - 1)N : n_0 + 2^{m-1} N - 1),$$

$$R_{2^{m-1}+1} = r(n_0 + N_t + 2^{m-1} N : n_0 + N_t + 2^{m-1} N + N - 1),$$

$$\vdots$$

$$R_{2^m} = r(n_0 + N_t + (2^m - 1)N : n_0 + N_t + 2^m N - 1).$$

Next, to separate vector l of user k, apply a sub-vector of row $\rho_k$ of the Hadamard matrix to the corresponding sub-vector of R, using block matrix multiplication:

$$Y_l(k) = \frac{1}{2^{m-n_k}} H_m(\rho_k, l + [0 : 2^{n_k} : 2^m - 2^{n_k}]) \cdot R(l + [0 : 2^{n_k} : 2^m - 2^{n_k}]),$$

$$l = 1, \ldots, 2^{n_k}$$

Or equivalently $$Y_l(k) = \frac{1}{2^{m-n_k}} \sum_{i=1}^{2^{m-n_k}} H_m(\rho_k, l + 2^{n_k}(i-1)) R_{l+2^{n_k}(i-1)}, \; l = 1, \ldots, 2^{n_k}$$

This is a vector of length N. This application of the Hadamard transform has completely separated the users.

Thus, block-wise application of the Hadamard transform completely separates the users and reduces the noise power by $10 \log_{10}(2^{m-n_k}) \approx 3(m-n_k)$ dB. The color of noise is preserved since the Hadamard transform is orthogonal.

Since a cyclic prefix is only inserted between every two bit vectors, there will be inter-symbol interference between pairs of vectors $Y_{2i-1}(k)$ and $Y_{2i}(k)$. Therefore, the vectors are pair-wise concatenated before the final demodulation step.

Figure 18:
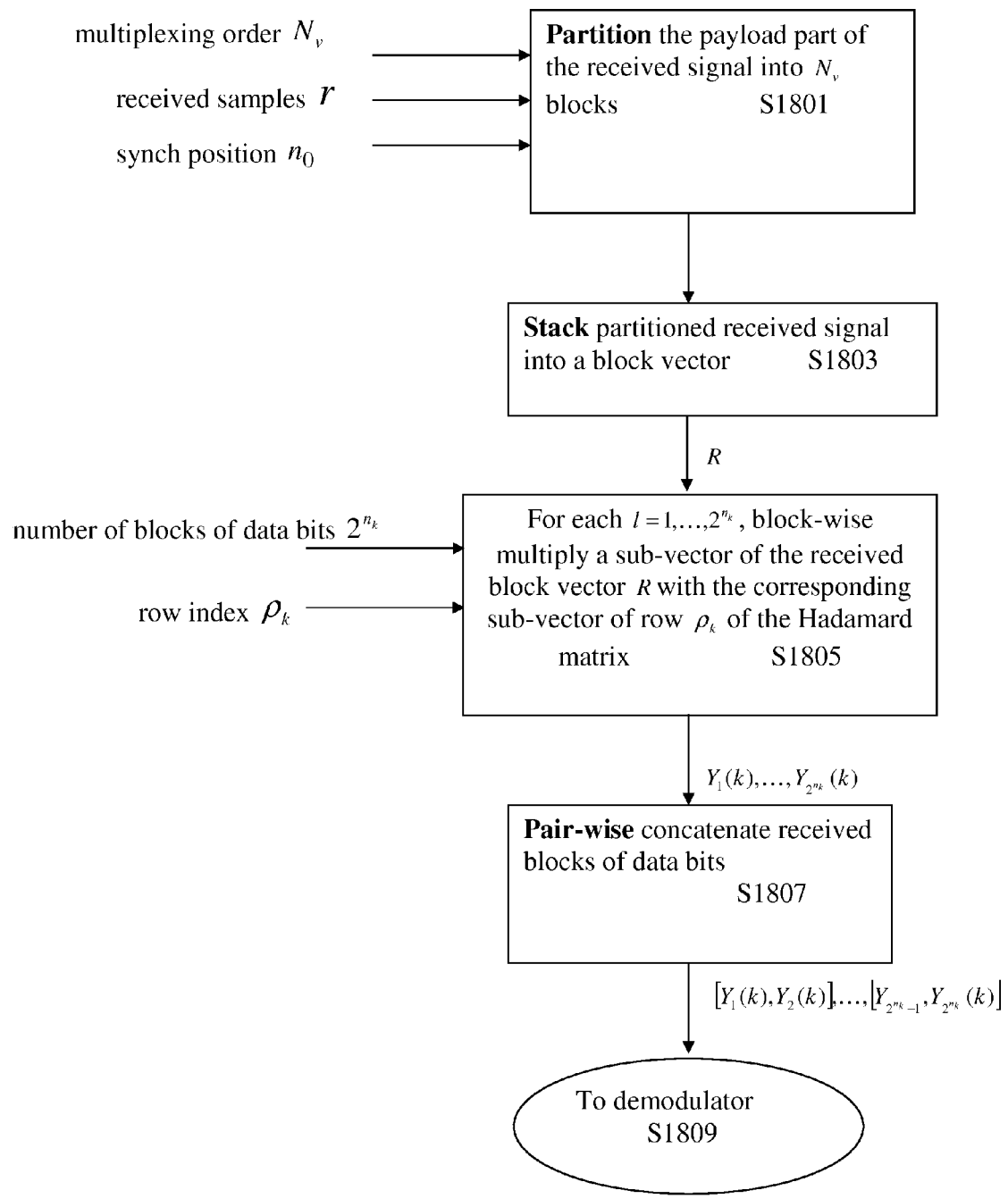
FIG. 18 is a flowchart illustrating receiver processing.

The receiver processing steps are illustrated in FIG. 18.

FIG. 18 depicts receiver side processing for one user, in case a cyclic prefix is used at the transmitter. It assumes a single antenna receiver. This is typically the most challenging case for multi-user reception, and generalizations to more antenna branches are straightforward.

In a first step S1801 received digital signal is input, the multiplexing order and the hypothesized synchronization position are also obtained in step S1801. In step S1801 the received signal is partitioned into time blocks of equal length.

Then in a step S1803 the partitioned signal is stacked to form a column block vector.

Then in a step 1805 the number of blocks of data bits $2^{n_k}$ and the row index $\rho_k$ of user k are input. Also the column block vector of received samples R and row $\rho_k$ of the Hadamard matrix are each divided into $2^{n_k}$ sub-vectors, for example as described above. The sub-vectors are block-wise multiplied. This means that the entries of the block vector are multiplied by one or minus one. Multiplication of vector and scalar is performed as usual, all entries of the vector are multiplied by the scalar, in this case either one or minus one. The output is $2^{n_k}$ vectors representing the data bits transmitted by user k. These vectors contain only energy from a chosen user, while the energy from all other users has been cancelled.

Next, in a step 1807 the $2^{n_k}$ vectors are pair-wise concatenated.

Finally, in a step 1809, the vectors are sent to a demodulator for example to an ordinary GMSK demodulator.

In case there is no cyclic prefix the receiver is modified accordingly for the multi-rate case.

Further it should be noted that the time dispersive channel can be modeled as addition of one or more time shifted versions of the transmitted signal. The effect of this and the addition of a cyclic prefix as described above is illustrated in FIG. 19 for $2^m = 4$ and $2^{n_k} = 1$.

Figure 19:
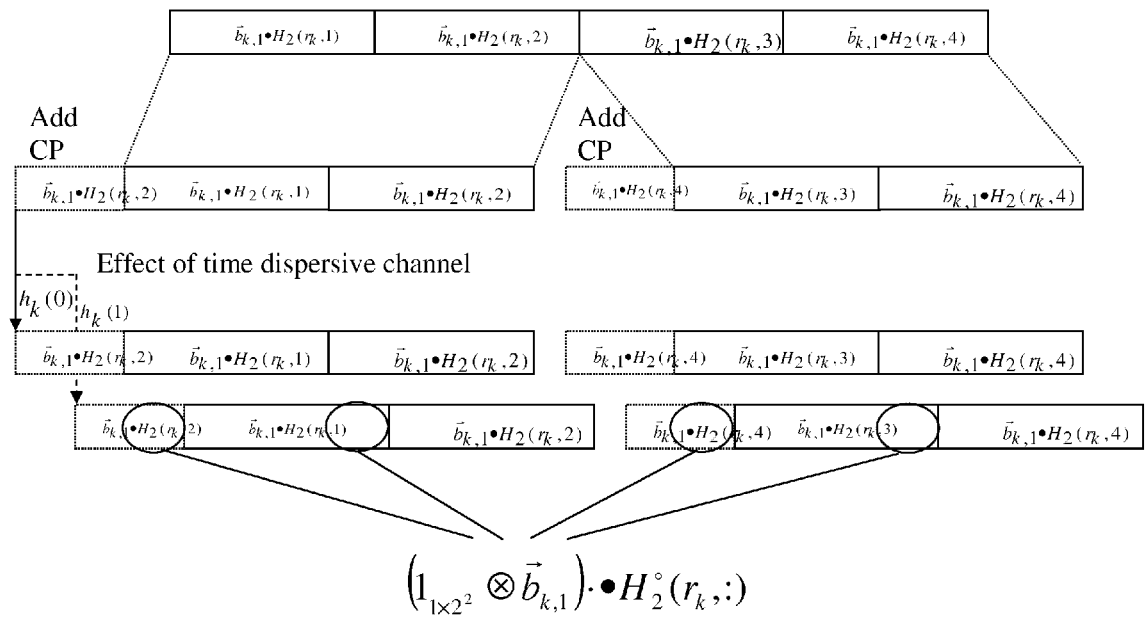
FIG. 19 is an illustration of the impact of a time dispersive channel.

The inter-symbol interference into the subsequent time blocks marked with circles in FIG. 19 can be described by the generalized Hadamard matrix product of the last L bits of the transmitted bit vector $\vec{b}_{k,1}$ by a row of a column-permuted version of the Hadamard matrix $H_2$, here denoted $H^\circ_2$. The matrix $H^\circ_2$ is defined by $$H^\circ_2 = [H_2(:,2) H_2(:,1) H_2(:,4) H_2(:,3)]$$

Notice that $$\frac{1}{4} H_2 \cdot H_2^o = \begin{bmatrix} 1 & 0 & 0 & 0 \\ 0 & -1 & 0 & 0 \\ 0 & 0 & 1 & 0 \\ 0 & 0 & 0 & -1 \end{bmatrix}$$

This means that orthogonality is maintained between the subchannels also in the presence of time dispersion. The negative signs in the matrix above mean that the time shifted component(s) of the received signal will be phase shifted 180 degrees compared to the original signal. Notice that in addition to this phase shift, each time shifted component will also be subject to independent fading, including a phase shift.

In general, the time shifted component(s) of the received signal will be described by the matrix $H°_n$ defined by $$H°_n = [H_n(:,2) H_n(:,1) H_n(:,4) H_n(:,3) \ldots H_n(:,2^n) H_n(:,2^n-1)]$$

and $$\frac{1}{2^n} H_n \cdot H_n^o = \begin{bmatrix} 1 & 0 & \cdots & 0 \\ 0 & -1 & \cdots & 0 \\ \vdots & \vdots & \ddots & 0 \\ 0 & 0 & 0 & -1 \end{bmatrix}$$

with orthogonality between the sub-channels maintained for $2^{n_k}=1$.

It can be shown that orthogonality is maintained also for $2^{n_k}>1$ as long as the rules for row selection described above are followed.

From the above it can be seen that depending on if the users in a sharing a slot have equal rate or different rates the transmitter may require different information. In both cases the user needs the rate with which it is transmitting. However, in the case with equal transmission rate the rate will correspond to the number of users sharing the same slot. Hence in the case with equal transmission rate the number of users in the slot will be sufficient information for the user. To exemplify the difference between equal rate and multi-rate cases, let M be the number of users. M is typically a power of 2 because the number of rows in the Hadamard matrices are also a power of 2. (That is, M=2, 4, 8, 16 . . . ).

In the equal rate case, the payload bits of each user are repeated blockwise M times.

In the case with unequal rate, the users are assigned rates 1/R1, 1/R2, . . . , 1/RM by the network. The numbers R1, . . . , RM are positive integers. Moreover, it is a requirement that 1/R1+1/R2+ . . . +1/RM<=1. The k-th user needs to know its rate Rk, but it does not need to know the rate of the other users. The k-th user repeats its data block Rk times. In other words the rate is the reciprocal of the number of repetitions.

Note that in the equal rate case all users have rate R=1/M, and therefore knowing the number of users is equivalent to knowing the rate. But in the multi-rate case knowing the number of users is not enough. Each user is assigned a rate. Alternatively, user k is assigned the number of repetitions Rk, which is the reciprocal of the rate 1/Rk.

For example, assume that there are M=4 users in a slot. Assume further that the rates are unequal such that: R1=2, R2=4, R3=8, R4=8. Note ½+¼+⅛+⅛=1. In this case User 1 repeats his data 2 times, user 2 repeats 4 times, while users 3 and 4 repeat their data 8 times each. In the corresponding case with equal rates: R1=4, R2=4, R3=4, R4=4. Note, Rk=M, and ¼+¼+¼+¼=1. Each user repeats his data 4 times.

Also as can be seen from the above the selection of the size of the Hadamard matrix will correspond to the inverse of the rate of the user with the lowest rate. For example, in case the lowest rate in the slot is ⅛ the size of the Hadamard matrix needs to have a size of 8×8. Hereby it is assured that each user can select a unique row in the Hadamard matrix to be used when determining which bits to flip. Again in the case with equal rates in the slot the rate will correspond to the number of users in the slot so for the case with equal number of users the required size of the Hadamard matrix will correspond to the number of users.

Figure 14:
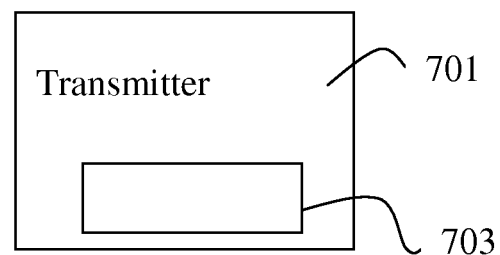
FIG. 14 is a general view of a transmitter.

FIG. 14 depicts a transmitter 701 for generating and transmitting signals as described herein. The transmitter can be implemented in a mobile station. The transmitter can also be implemented in a radio base station. The transmitter 701 comprises controller circuitry 703 for performing the various steps required when forming a signal for transmission in accordance with the principles described herein. The controller circuitry can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

Figure 15:
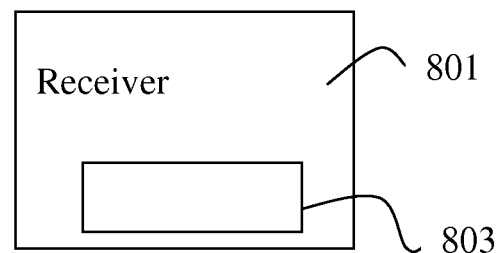
FIG. 15 is a general view of a receiver.

FIG. 15 depicts a receiver 701 for receiving and processing received signals as described herein. The receiver can be implemented in a radio base station. The receiver can also be implemented in a mobile station. The receiver 301 comprises controller circuitry 703 for performing the various steps required when receiving signals in accordance with the principles described herein. The controller circuitry can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

Using the transmission methods and devices as described herein provides a way to multiplex several modulated signals into one time slot. Using the methods and devices as described herein can provide the benefits that orthogonal channels are created, and the method can be used in both uplink and downlink transmissions. In particular truly orthogonal channels can be achieved meaning that perfect orthogonality (in the frequency domain) can be achieved for two or more users.

Also, the transmitters may employ GMSK modulation or other form of CPM, which due to its constant envelope, is very convenient for use in mobile stations and leads to energy efficiency. Further a single antenna receiver is enough to receive and demodulate more than 2 users.

In addition, at the receiver side, a very simple operation decouples the users. The complexity of the demodulation process depends only on the length on the burst. In particular, it is independent of the number of users. A GMSK demodulator may be used. Further, the methods and devices may be used in conjunction with Multiple Input Multiple Output (MIMO) or Multi-User MIMO (MU-MIMO). They can be used to create shared signaling channels (e.g. fast feedback channels in GSM), or shared data channels. In addition to digital telephony systems, they may be of use in satellite communications systems or maritime communications systems, whenever the energy efficiency calls for constant envelope modulation and whenever there is a need to multiplex several users into one time slot. Also burst formatting of today can be kept intact and that legacy mobiles supporting GMSK modulation can be used with additional complexity of bit flipping and bit repetition.

Finally it is to be noted that other implementations than those specifically set forth herein can of course be formed without departing from essential characteristics of the described methods and devices. The present embodiments are to be considered in all respects as illustrative and not restrictive.

The invention claimed is:

1. A method of modulating a signal to be transmitted from a transmitter, where the signal is transmitted in a slot with multiple users, referred to as N users, and the method comprises:
   determining a number of users, N, to share a single time slot of a transmission channel by creating orthogonal sub-channels for the transmission channel utilizing a non-linear continuous phase modulation technique, wherein N is greater than two, wherein N orthogonal sub-channels are created;
   obtaining user specific payload bits in a block and a rate at which a transmitter is to transmit in the single time slot, wherein the rate is determined by a number of users in the single time slot;
   repeating the block of the user specific payload bits to form a combined block of payload bits, where the block of the user specific payload bits is repeated N times, which is a number of times equal to an inverse of the rate of transmission by the transmitter and where at least a portion of the user specific payload bits in each repeated block are flipped, wherein the blocks that are flipped are selected according to a row of a Hadamard matrix, wherein a selected row of the Hadamard matrix is specific to one of the N users sharing the single time slot, wherein a transformation resulting from the Hadamard matrix is an orthogonal transformation; and
   burst formatting and modulating the combined block of payload bits to create a burst, which is a period of Radio Frequency (RF) carrier modulated by a data stream, wherein during the burst formatting guard, tail, and training bits are inserted and placed in a predefined order together with the user specific payload bits.

2. The method according to claim 1, wherein a number of columns of the Hadamard matrix is at least the inverse of the rate.

3. The method according to claim 1, further comprising dividing the combined block into two equal block halves.

4. The method according to claim 3, wherein a cyclic prefix is added to each of the two block halves.

5. The method according to claim 1, wherein the burst is formatted in accordance with a Global System for Mobile Communications (GSM) burst format.

6. The method according to claim 1, wherein the burst is modulated using a Gaussian Minimum Shift Keying (GMSK) modulator.

7. The method according to claim 1, wherein the transmitter is a mobile station transmitter and transmits the signal.

8. The method according to claim 1, wherein the bandwidth in the single time slot is divided unequally between the users in the single time slot.

9. The method according to claim 1, wherein the bandwidth in the single time slot is divided equally between the users in the single time slot.

10. The method according to claim 9, wherein the rate is determined by the number of users in the single time slot.

11. The method according to claim 10, wherein the number of columns of the Hadamard matrix is equal to the number of users in the single time slot.

12. A method of receiving a modulated signal from a user equipment transmitting a signal in a slot with multiple users, referred to as N users, the method comprising:
   determine a number of users, N, to share a single time slot of a transmission channel by creating orthogonal sub-channels for the transmission channel utilizing a non-linear continuous phase modulation technique, wherein N is greater than two, wherein N orthogonal sub-channels are created;
   obtaining a rate used by the user equipment for transmitting the signal in the single time slot, wherein the rate is determined by the number of users in the single time slot, wherein the signal conveys a combined block of payload bits generated by the user equipment by repeating, N times, a block of the payload bits, wherein N times is equal to an inverse of the rate of transmission by the user equipment, wherein at least a portion of the payload bits in each repeated block are flipped according to a row of a Hadamard matrix, wherein a transformation resulting from the Hadamard matrix is an orthogonal transformation;
   obtaining the row of the Hadamard matrix used by the user equipment, which is a row corresponding to the user equipment and not to equipment of any of the other N users;
   determining a synchronization position for a received signal;
   partitioning the received signal into blocks of equal length, where a number of blocks corresponds to the inverse of the rate of transmission by the user equipment;
   unflipping samples in each partitioned block such that all blocks flipped at the transmitter are multiplied by −1;
   forming a result block by adding element-wise entries in all the partitioned blocks; and
   demodulating the result block.

13. A transmitter configured to modulate a signal, where the signal is transmitted in a slot with multiple users, referred to as N users, the transmitter comprising controller circuitry coupled to a processor configured to:
   determine a number of users, N, to share a single time slot of a transmission channel by creating orthogonal sub-channels for the transmission channel utilizing a non-linear continuous phase modulation technique, wherein N is greater than two, wherein N orthogonal sub-channels are created;
   obtain user specific payload bits in a block and a rate at which the transmitter is to transmit in the single time slot wherein the rate is determined by the number of users in the single time slot;
   repeat the block of the user specific payload bits to form a combined block, where the block of the user specific payload bits is repeated N times, which is a number of times equal to an inverse of the rate of transmission by the transmitter and wherein at least a portion the user specific payload bits in each repeated block are flipped, wherein the processor is configured to select blocks that are flipped according to a row of a Hadamard matrix, wherein a selected row of the Hadamard matrix is specific to one of the N users sharing the single time slot, wherein a transformation resulting from the Hadamard matrix is an orthogonal transformation; and burst format and modulate the combined block of payload bits to create a burst, which is a period of Radio Frequency (RF) carrier modulated by a data stream, wherein during the burst formatting guard, tail, and training bits are inserted and placed in a predefined order together with the user specific payload bits.

14. The transmitter according to claim 13, wherein a number of columns of the Hadamard matrix is at least the inverse of the rate.

15. The transmitter according to claim 13, wherein the processor is configured to divide the combined block into two equal block halves.

16. The transmitter according to claim 15, wherein the processor is configured to add a cyclic prefix to each of the two block halves.

17. The transmitter according to claim 13, wherein the transmitter is configured to format the burst in accordance with a Global System for Mobile Communications (GSM) burst format.

18. The transmitter according to claim 13, wherein the transmitter is configured to modulate the burst using a Gaussian Minimum Shift Keying (GMSK) modulator.

19. The transmitter according to claim 13, wherein the transmitter comprises a mobile station transmitted in a mobile station.

20. The transmitter according to claim 13, wherein bandwidth in the single time slot is divided unequally between the users in the single time slot.

21. The transmitter according to claim 13, wherein bandwidth in the single time slot is divided equally between the users in the single time slot.

22. The transmitter according to claim 21, wherein the rate is determined by the number of users in the single time slot.

23. The transmitter according to claim 22, wherein the processor is configured to repeat the block as many times as there are users in the single time slot.

24. The transmitter according to claim 22, wherein a number of columns of the Hadamard matrix is equal to the number of users in the single time slot.

25. A receiver for receiving a modulated signal from a user equipment transmitting a signal in a slot with multiple users, referred to as N users, the receiver comprising controller circuitry coupled to a processor configured to:

determine a number of users, N, to share a single time slot of a transmission channel by creating orthogonal sub-channels for the transmission channel utilizing a non-linear continuous phase modulation technique, wherein N is greater than two, wherein N orthogonal sub-channels are created;

obtain a rate used by the user equipment for transmitting the signal in the single time slot, wherein the rate is determined by the number of users in the single time slot, wherein the transmit signal conveys a combined block of payload bits generated by the user equipment by repeating, N times, a block of the payload bits, wherein N times is equal to an inverse of the rate of transmission by the user equipment, wherein at least a portion of the payload bits in each repeated block are flipped according to a row of a Hadamard matrix, wherein a transformation resulting from the Hadamard matrix is an orthogonal transformation;

obtain the row of a Hadamard matrix used by the user equipment, which is a row corresponding to the user equipment and not to equipment of any of the other N users;

determine a synchronization position for a received signal received by the receiver;

partition the received signal into blocks of equal length, where a number of blocks corresponds to the inverse of the rate of transmission by the user equipment;

unflip samples in each partitioned block such that all blocks flipped at the transmitter are multiplied by −1;

form a result block by adding element-wise entries in all the partitioned blocks; and demodulate the result block.

* * * * *